United States Patent
Ozawa et al.

(10) Patent No.: US 6,388,965 B2
(45) Date of Patent: May 14, 2002

(54) DUBBING APPARATUS AND DUBBING METHOD

(75) Inventors: Hiroyuki Ozawa, Tokyo; Tatsuhito Tabuchi, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/730,028

(22) Filed: Dec. 5, 2000

(30) Foreign Application Priority Data

Dec. 17, 1999 (JP) ............................................ 11-359285

(51) Int. Cl.[7] ................................................. G11B 7/00
(52) U.S. Cl. ........................ 369/47.12; 369/84; 369/47.1
(58) Field of Search ............................. 369/47.1, 47.11, 369/47.12, 47.13, 47.15, 47.28, 47.29, 53.1, 53.34, 59.1, 83, 84, 85

(56) References Cited

U.S. PATENT DOCUMENTS 5,402,406 A * 3/1995 Fuma et al. .................. 369/84
6,222,807 B1 * 4/2001 Min-Jae .................... 369/47.12
6,298,022 B1 * 10/2001 Aramaki et al. ......... 369/47.11

* cited by examiner

Primary Examiner—Muhammad Edun
(74) Attorney, Agent, or Firm—Oblon, Spivak, McClelland, Maier & Neustadt, P.C.

(57) ABSTRACT

In a dubbing apparatus capable of prohibiting next high-speed dubbing of a piece of data once completing high-speed dubbing for a predetermined period of time in a process of high-speed dubbing from a first recording medium to a second recording medium, such a piece of data cannot be dubbed at a high speed but can be dubbed at an ordinary speed during the predetermined period of time in response to a request for re-dubbing of the piece of data at the high speed. It is thus possible to achieve an object of the dubbing apparatus to protect a copyright for prohibiting an operation to copy data to a plurality of recording mediums at one time.

When the user issues a command to again carry out high-speed dubbing of pieces of data, high-speed dubbing of pieces of data once subjected to high-speed dubbing during the predetermined period of time is deferred. Pieces of data not subjected to high-speed dubbing during the predetermined period of time are dubbed at a high speed, taking precedence of the pieces of data once subjected to high-speed dubbing during the predetermined period of time.

15 Claims, 20 Drawing Sheets

FIG. 4

| | 16 BITS || 16 BITS || |
|---|---|---|---|---|---|
| | MSB        LSB | MSB        LSB | MSB        LSB | MSB        LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector | 00000000 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc Serial No | 10 |
| CORRES-PONDING-TABLE POINTER DATA PORTION { | Disc | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| MANAGE-MENT TABLE PORTION (255 SLOTS) | (01h) START ADDRESS || | TRACK MODE | 78 |
| | END ADDRESS ||| LINK INFORMATION | 79 |
| | (02h) START ADDRESS ||| TRACK MODE | 80 |
| | END ADRESS ||| LINK INFORMATION | 81 |
| | (03h) START ADDRESS ||| TRACK MODE | 82 |
| | END ADRESS ||| LINK INFORMATION | 83 |
| | (FCh) START ADDRESS ||| TRACK MODE | 580 |
| | END ADDRESS ||| LINK INFORMATION | 581 |
| | (FDh) START ADDRESS ||| TRACK MODE | 582 |
| | END ADDRESS ||| LINK INFORMATION | 583 |
| | (FEh) START ADDRESS ||| TRACK MODE | 584 |
| | END ADDRESS ||| LINK INFORMATION | 585 |
| | (FFh) START ADDRESS ||| TRACK MODE | 586 |
| | END ADDRESS ||| LINK INFORMATION | 587 |

FIG. 6
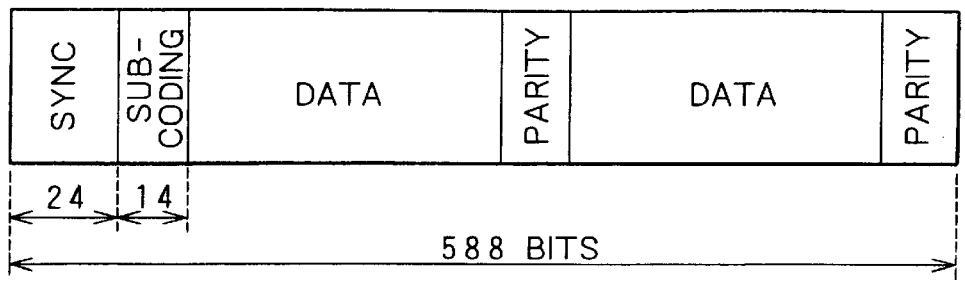
FIG. 7A
| FRAME | SUB-CODING FRAME |
|---|---|
| 98n+1 | SYNC PATTERN |
| 98n+2 | SYNC PATTERN |
| 98n+3 | P1 Q1 R1 S1 T1 U1 V1 W1 |
| 98n+4 | P2 Q2 R2 S2 T2 U2 V2 W2 |
| ⋮ | ⋮ |
| 98n+97 | P95 Q95 R95 S95 T95 U95 V95 W95 |
| 98n+98 | P96 Q96 R96 S96 T96 U96 V96 W96 |
| 98(n+1)+1 | |
FIG. 7B
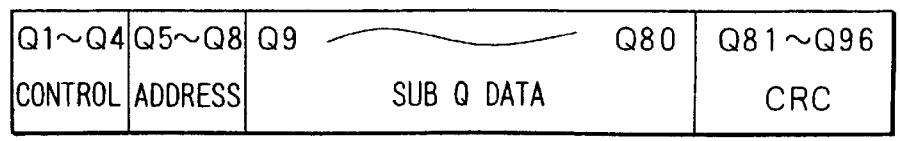

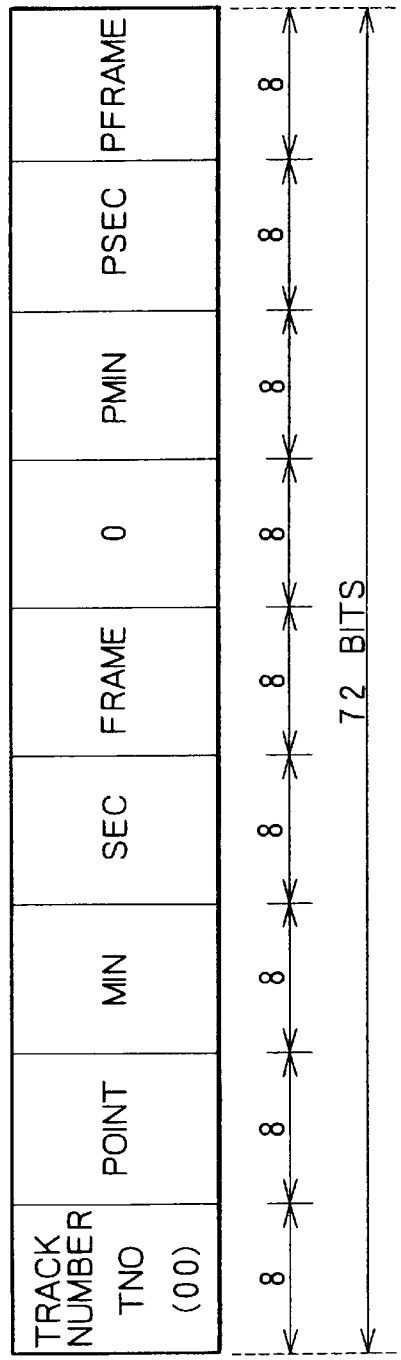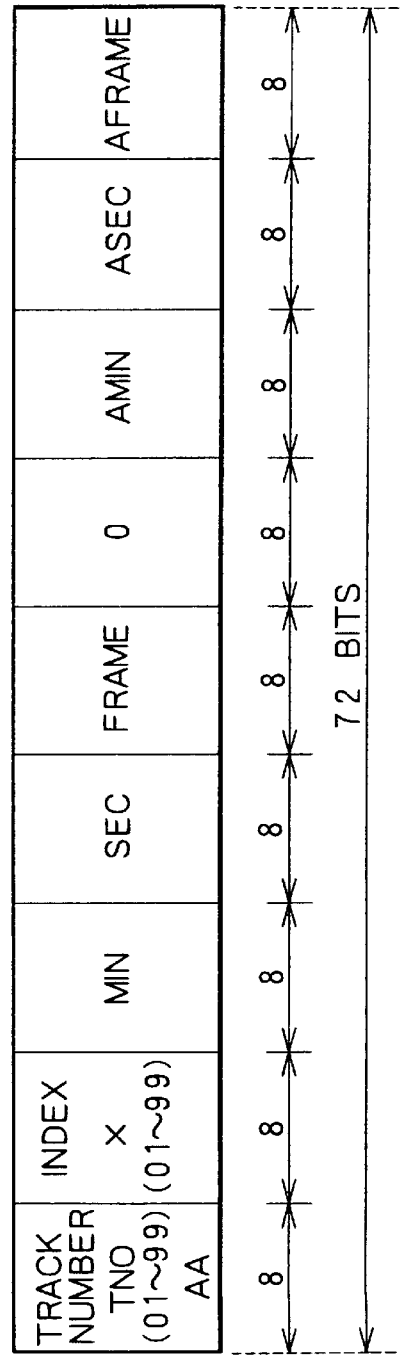

FIG. 9

| TNO | BLOCK No. | POINT | PMIN, PSEC, PFRAME | |
|---|---|---|---|---|
| 00 | n | 01 | 00.02.32 | START POINT OF TRACK #1 |
| | n+1 | 01 | 00.02.32 | |
| | n+2 | 01 | 00.02.32 | |
| | n+3 | 02 | 10.15.12 | START POINT OF TRACK #2 |
| | n+4 | 02 | 10.15.12 | |
| | n+5 | 02 | 10.15.12 | |
| | n+6 | 03 | 16.28.63 | START POINT OF TRACK #3 |
| | n+7 | 03 | 16.28.63 | |
| | n+8 | 03 | 16.28.63 | |
| | n+9 | 04 | . . | |
| | n+10 | 04 | . . | |
| | n+11 | 04 | . . | |
| | n+12 | 05 | . . | |
| | n+13 | 05 | . . | |
| | n+14 | 05 | . . | |
| | n+15 | 06 | 49.10.03 | START POINT OF TRACK #6 |
| | n+16 | 06 | 49.10.03 | |
| | n+17 | 06 | 49.10.03 | |
| | n+18 | A0 | 01.00.00 | TRACK NUMBER OF THE FIRST TRACK ON THE DISC |
| | n+19 | A0 | 01.00.00 | |
| | n+20 | A0 | 01.00.00 | |
| | n+21 | A1 | 06.00.00 | TRACK NUMBER OF THE LAST TRACK ON THE DISC |
| | n+22 | A1 | 06.00.00 | |
| | n+23 | A1 | 06.00.00 | |
| | n+24 | A2 | 52.48.41 | START POINT OF THE LEAD-OUT TRACK |
| | n+25 | A2 | 52.48.41 | |
| 00 | n+26 | A2 | 52.48.41 | |
| 00 | n+27 | 01 | 00.02.32 | DITTO |
| | n+28 | 01 | 00.02.32 | |
| | . | . | . . | |
| | . | . | . . | |
| | . | . | . . | |

FIG. 11

| Character | Binary | Octal |
|-----------|--------|-------|
| 0 | 000000 | 00 |
| 1 | 000001 | 01 |
| 2 | 000010 | 02 |
| 3 | 000011 | 03 |
| 4 | 000100 | 04 |
| 5 | 000101 | 05 |
| 6 | 000110 | 06 |
| 7 | 000111 | 07 |
| 8 | 001000 | 10 |
| 9 | 001001 | 11 |
| A | 010001 | 21 |
| B | 010010 | 22 |
| C | 010011 | 23 |
| D | 010100 | 24 |
| E | 010101 | 25 |
| F | 010110 | 26 |
| G | 010111 | 27 |
| H | 011000 | 30 |
| I | 011001 | 31 |
| J | 011010 | 32 |
| K | 011011 | 33 |
| L | 011100 | 34 |
| M | 011101 | 35 |
| N | 011110 | 36 |
| O | 011111 | 37 |
| P | 100000 | 40 |
| Q | 100001 | 41 |
| R | 100010 | 42 |
| S | 100011 | 43 |
| T | 100100 | 44 |
| U | 100101 | 45 |
| V | 100110 | 46 |
| W | 100111 | 47 |
| X | 101000 | 50 |
| Y | 101001 | 51 |
| Z | 101010 | 52 |

FIG. 16A

|MANAGEMENT NUMBER|TOTAL PERFORMANCE TIME|TOTAL NUMBER OF TRACKS|LEAD-OUT ADDRESS|TRACK NUMBER|TIMER ID|→|TIMER TIME|
|---|---|---|---|---|---|---|---|
|1|4023h|10h|4100h|02h|01h|→|30|
|2|4023h|10h|4100h|04h|02h|→|200|

⇩ ① PERFORM HIGH-SPEED DUBBING OF Tr1

FIG. 16B

|MANAGEMENT NUMBER|TOTAL PERFORMANCE TIME|TOTAL NUMBER OF TRACKS|LEAD-OUT ADDRESS|TRACK NUMBER|TIMER ID|→|TIMER TIME|
|---|---|---|---|---|---|---|---|
|1|4023h|10h|4100h|02h|01h|→|20|
|2|4023h|10h|4100h|04h|02h|→|190|

⇩ ② PERFORM HIGH-SPEED DUBBING OF Tr3

FIG. 16C

|MANAGEMENT NUMBER|TOTAL PERFORMANCE TIME|TOTAL NUMBER OF TRACKS|LEAD-OUT ADDRESS|TRACK NUMBER|TIMER ID|→|TIMER TIME|
|---|---|---|---|---|---|---|---|
|1|4023h|10h|4100h|02h|01h|→|10|
|2|4023h|10h|4100h|04h|02h|→|180|

⇩ ③ PERFORM HIGH-SPEED DUBBING OF Tr5 TO Tr10

FIG. 16D

|MANAGEMENT NUMBER|TOTAL PERFORMANCE TIME|TOTAL NUMBER OF TRACKS|LEAD-OUT ADDRESS|TRACK NUMBER|TIMER ID|→|TIMER TIME|
|---|---|---|---|---|---|---|---|
|1|4023h|10h|4100h|02h|01h|→|0|
|2|4023h|10h|4100h|04h|02h|→|120|

⇩ ④ PERFORM HIGH-SPEED DUBBING OF Tr2

FIG. 16E

|MANAGEMENT NUMBER|TOTAL PERFORMANCE TIME|TOTAL NUMBER OF TRACKS|LEAD-OUT ADDRESS|TRACK NUMBER|TIMER ID|→|TIMER TIME|
|---|---|---|---|---|---|---|---|
|1|4023h|10h|4100h|02h|01h|→|0|
|2|4023h|10h|4100h|04h|02h|→|110|

⇩

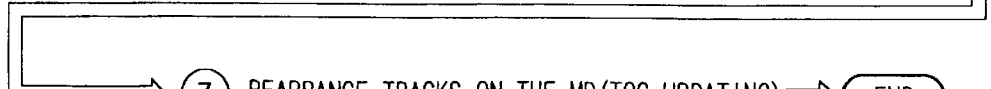

⑤ PERFORM 1-TIME-SPEED DUBBING OF Tr4 ⇒ ⑥ END DUBBING RECORDING

⇒ ⑦ REARRANGE TRACKS ON THE MD (TOC UPDATING) ⇒ ( END )

FIG. 19

CORRESPONDING-TABLE POINTER DATA PORTION (POINTER TABLE)

| P-DFA: — | P-EMPTY:0Ch | P-FRA:0Bh |
|---|---|---|
| P-TNO1:01h | P-TNO2:02h | P-TNO3:03h |
| P-TNO4:04h | P-TNO5:05h | P-TNO6:06h |
| P-TNO7:07h | P-TNO8:08h | P-TNO9:09h |
| P-TNO10:0Ah | P-TNO11: — | P-TNO12: — |
| P-TNO253: — | P-TNO254: — | P-TNO255: — |

MANAGEMENT TABLE PORTION (255-PART TABLE)

| | START ADDRESS | END ADDRESS | TRACK MODE | LINK INFORMATION |
|---|---|---|---|---|
| (01h) | A0 [Tr 1] | A1 | | |
| (02h) | A2 [Tr 3] | A3 | | — |
| (03h) | A4 [Tr 5] | A5 | | — |
| (04h) | A6 [Tr 6] | A7 | | — |
| (05h) | A8 [Tr 7] | A9 | | — |
| (06h) | A10 [Tr 8] | A11 | | — |
| (07h) | A12 [Tr 9] | A13 | | — |
| (08h) | A14 [Tr 10] | A15 | | — |
| (09h) | A16 [Tr 2] | A17 | | — |
| (0Ah) | A18 [Tr 4] | A19 | | — |
| (0Bh) | A20 [FREE AREA] | A21 | | — |
| (0Ch) | — | — | | 0Dh |
| (0Dh) | — | — | | 0Eh |
| (FEh) | — | — | | FFh |
| (FFh) | — | — | | — |

FIG. 20

CORRESPONDING-TABLE POINTER DATA PORTION (POINTER TABLE)

| P-DFA: — | P-EMPTY: 0Ch | P-FRA: 0Bh |
|---|---|---|
| P-TNO1: 01h | P-TNO2: 09h | P-TNO3: 02h |
| P-TNO4: 0Ah | P-TNO5: 03h | P-TNO6: 04h |
| P-TNO7: 05h | P-TNO8: 06h | P-TNO9: 07h |
| P-TNO10: 08h | P-TNO11: — | P-TNO12: — |
| P-TNO253: — | P-TNO254: — | P-TNO255: — |

MANAGEMENT TABLE PORTION (255-PART TABLE)

| | START ADDRESS | END ADDRESS | TRACK MODE | LINK INFORMATION |
|---|---|---|---|---|
| (01h) | A0 [Tr1] | A1 | | |
| (02h) | A2 [Tr3] | A3 | | — |
| (03h) | A4 [Tr5] | A5 | | — |
| (04h) | A6 [Tr6] | A7 | | — |
| (05h) | A8 [Tr7] | A9 | | — |
| (06h) | A10 [Tr8] | A11 | | — |
| (07h) | A12 [Tr9] | A13 | | — |
| (08h) | A14 [Tr10] | A15 | | — |
| (09h) | A16 [Tr2] | A17 | | — |
| (0Ah) | A18 [Tr4] | A19 | | — |
| (0Bh) | A20 [FREE AREA] | A21 | | — |
| (0Ch) | — | — | | 0Dh |
| (0Dh) | — | — | | 0Eh |
| (FEh) | — | — | | FFh |
| (FFh) | — | — | | — |

DUBBING APPARATUS AND DUBBING METHOD

BACKGROUND OF THE INVENTION

The present invention relates to a dubbing apparatus and a dubbing method, which are capable of protecting a copyright by typically execution of a management function for program data to be dubbed.

In recent years, a CD (Compact Disc) player functioning as a playback apparatus capable of playing back data from a CD has been becoming widely popular. In addition, disc media such an MD (mini disc), which audio data is recorded and played back, and a recording/playback apparatus for such disc media have also been becoming very popular as well.

Furthermore, there is also popularized an audio system, which is a combination of, among other components, a CD player and an MD recorder/player serving as a recording/playback apparatus for an MD.

By the way, in a system such as the CD player and the MD recorder/player, audio data is controlled in units each referred to as the so-called program. The technical term program used in this specification means a data group recorded on a disc and controlled as a unit. In the case of audio data, for example, a program corresponds to a piece of music. A program is also referred to hereafter as a track. Thus, in general, a piece of music is also called a track.

Generally, in an audio system like the one described above, audio data played back from a CD by a CD player can be recorded into an MD by an MD recorder/player in a process known as dubbing recording.

There is also a system capable of carrying out the so-called high-speed dubbing in order to shorten the recoding time.

In high-speed dubbing, a disc-rotation driving control system or a playback-signal-processing system employed in the CD player is controlled so as to play back audio data from a CD at a predetermined multiple-time speed, which is higher than the normal playback speed. At the same time, a recording-signal-processing system employed in the MD recorder/player is also controlled so that the system operates at a multiple-time speed corresponding to the multiple playback speed of the CD to receive the audio data played back by the CD player and record it onto an MD.

In an integrated apparatus including a CD player as a playback unit and an MD recorder/player as a recording unit, for example, it is easy to execute control for the high-speed dubbing described above so that the CD player and the MD recorder/player operate at the same time at a predetermined multiple-time speed. Even in a separate-component system with a playback apparatus provided separately from a recording apparatus, the playback apparatus can be connected to the recording apparatus by using typically a control cable to form a configuration in which the playback apparatus is capable of communicating with the recording apparatus. In such a configuration, the high-speed dubbing can be implemented with ease by synchronously controlling the operations of the playback apparatus connected to the recording apparatus.

However, a dubbing operation generates a copy of data of a musical work or the like produced by the author such as a song and thus infringes the right of the author. A dubbing operation should thus be handled as an action to be avoided whenever possible. By carrying out high-speed dubbing, however, the number of tracks that can be dubbed per time unit is greater than that obtained from the normal 1-time-speed dubbing.

Thus, the user is capable of copying a CD or a track recorded on a CD to a number of MDs exceeding a range of private use judged to be normal by a common sense and using the MDs each containing a copy for some purposes.

If the user is allowed to carry out high-speed dubbing, the user is capable of copying a CD or a track recorded on a CD to a number of MDs during a shorter period of time more and in a more efficient way than the normal 1-time-speed dubbing. That is to say, on the other side of the coin, high-speed dubbing promotes infringement upon a copyright.

In order to solve this problem, a standard called an HCMS (High-speed Copy Management System) is proposed.

In accordance with the HCMS standard, when a digital musical source such as a CD is copied to media such as an MD in high-speed dubbing, the next high-speed dubbing of a track completing high-speed dubbing as a piece of music is prohibited during a period of at least 74 minutes following a point of time at which high-speed dubbing of the track was started. The prohibition period of high-speed dubbing is set at 74 minutes because the maximum total nominal playback time of a CD is 74 minutes. Since high-speed dubbing of a track is prohibited during a period of time required to play back a CD, a dubbing efficiency per track is about equal to that of one-time-speed dubbing. If a dubbing apparatus is designed to restrict high-speed dubbing in accordance with the HCMS as described above, the user is allowed to carry out dubbing within a range not infringing the copyright of the author. It should be noted that specifications of an apparatus having a dubbing function can be determined arbitrarily as long as the specifications do not violate the standard.

The following is an example of a generally conceivable operation to restrict high-speed dubbing in accordance with the HCMS standard.

Assume that a disc serving as a source of dubbing has recorded data like that shown in FIG. 1A. As shown in the figure, the disc contains 5 recorded tracks Tr1 to Tr5. The user has already dubbed only the track Tr3 at a high speed at a previous predetermined time. Thus, the track Tr3 is set as an object of HCMS management. That is to say, next high-speed dubbing is prohibited till a period of 74 minutes lapses since the start of the high-speed dubbing carried out at the previous predetermined time. It should be noted that the other 4 tracks Tr1, Tr2, Tr4 and Tr5 are not objects of the HCMS management so that each of them can be dubbed at a high speed at any other time.

Assume that, in an attempt to carry out dubbing of all tracks recorded on the CD shown in FIG. 1A under such a circumstance, the user starts high-speed dubbing by commencing a playback operation beginning with the track Tr1 on the CD as shown in FIG. 1B. It should be noted that the tracks Tr1 to Tr5 on the CD are played back sequentially in a track-number order.

In this case, the tracks Tr1 and Tr2 can be dubbed at a high speed sequentially since they are not objects of the HCMS management. At the end of the high-speed dubbing of the track Tr2, the operation enters a subsequent stage to dub the track Tr3, which is an object of the HCMS management. When a high-speed dubbing operation reaches a time to dub a track serving as an object of the HCMS management during a process of high-speed dubbing according to a track playback order of the CD as described above, however, the high-speed dubbing operation is discontinued to prevent the subsequent dubbing and recording process from being carried out.

By carrying out the operation as described above, the track under control of the HCMS management at the present time is not subjected to high-speed dubbing. That is to say, an operation conforming to the HCMS rule is performed.

With the restrictive specifications of the high-speed dubbing described above, however, the recording operation itself to dub tracks is halted so that the tracks Tr4 and Tr5 are not subjected to high-speed dubbing after the track Tr3 of the above example in accordance with the playback order as shown in FIG. 1B in spite of the fact that the tracks Tr4 and Tr5 are not objects of the HCMS management.

Such a restriction of the dubbing function is unreasonable for the user and becomes an excessive disturbance of the convenience of the dubbing function. To put it concretely, if a particular piece of music taken as an object of HCMS management is found among a plurality of pieces of music during sequential high-speed dubbing of the pieces of music, control is executed to halt the high-speed dubbing at a point of time an attempt is made to dub the particular piece of music and to discontinue the dubbing operation itself, raising a problem of inhibition of the operation to dub the particular piece of music taken as an object of HCMS management and subsequent pieces of music following the object of HCMS management.

SUMMARY OF THE INVENTION

It is thus an object of the present invention addressing the problems described above to prevent the freedom to use an apparatus having a dubbing function from being disturbed while taking protection of the copyright of the author into consideration.

To achieve the above object, according to a first aspect of the present invention, there is provided a dubbing apparatus capable of selecting either a predetermined-speed dubbing mode or a high-speed dubbing mode allowing dubbing of data to be carried out within a period of time shorter than that of the predetermined-speed dubbing mode in an operation to record data played back from a first recording medium for recording data controlled in program units into a second recording medium, the dubbing apparatus including time-measuring means for measuring the lapse of time, time-measurement control means for requesting the time-measuring means to start a time measurement for a particular piece of data selected from pieces of data recorded on the first recording medium and controlled in program units to undergo high-speed dubbing, time-information storage means for storing time information produced by the time-measuring means for a particular piece of data selected from the pieces of data recorded on the first recording medium and controlled in program units to undergo high-speed dubbing, operation means for selecting a particular piece of data desired by the user as an object of high-speed dubbing from the pieces of data recorded on the first recording medium and controlled in program units; and control means for referencing time information stored in the time-information storage means for a particular piece of data selected by the operation means as desired by the user as an object of high-speed dubbing and for switching from the predetermined-speed dubbing mode to the high-speed dubbing mode or vice versa in accordance with the referenced time information.

According to a second aspect of the present invention, there is provided a dubbing apparatus capable of selecting either a predetermined-speed dubbing mode or a high-speed dubbing mode allowing dubbing of data to be carried out within a period of time shorter than that of the predetermined-speed dubbing mode in an operation to record data played back from a first recording medium for recording data controlled in program units into a second recording medium, the dubbing apparatus including information storage means for storing information associated with one of the pieces of data stored in the first recording medium and used for indicating whether or not the piece of data associated with the information has been subjected to high-speed dubbing during a predetermined period of time in the past with the present point of time taken as a reference, high-speed-dubbing-judging means for forming a judgment as to whether or not a piece of data stored on the first recording medium and specified to undergo high-speed dubbing has been subjected to high-speed dubbing during a predetermined period of time in the past with the present point of time taken as a reference on the basis of information stored in the information storage unit and associated with the piece of data, and recording control means for assigning pending status to high-speed dubbing of a piece of data stored on the first recording medium and judged by the high-speed-dubbing-judging means to be a piece of data subjected to high-speed dubbing during a predetermined period of time in the past with the present point of time taken as a reference and for implementing high-speed dubbing of a piece of data stored on the first recording medium and judged by the high-speed-dubbing-judging means to be a piece of data not subjected to high-speed dubbing during a predetermined period of time in the past with the present point of time taken as a reference on a priority basis.

According to a third aspect of the present invention, there is provided a dubbing-processing method for prohibiting high-speed dubbing of a program stored on a first recording medium and subjected to high-speed dubbing during a predetermined period of time in the past with the present point of time taken as a reference till the end of the lapse of the predetermined period of time as a reaction to a command to again carry out high-speed dubbing on the program, the dubbing-processing method including the steps of forming a judgment as to whether or not a program stored in the first recording medium and specified to undergo high-speed dubbing is an object of high-speed-dubbing prohibition, and permitting predetermined-speed dubbing of a program stored in the first recording medium, specified to undergo high-speed dubbing and judged to be an object of high-speed-dubbing prohibition.

According to a fourth aspect of the present invention, there is provided a dubbing-processing method for carrying out sequential high-speed dubbing on a program stored on a first recording medium to a second recording medium in a dubbing apparatus prohibiting high-speed dubbing of a program stored on a first recording medium and subjected to high-speed dubbing during a predetermined period of time in the past with the present point of time taken as a reference till the end of the lapse of the predetermined period of time as a reaction to a command to again carry out high-speed dubbing on the program, the dubbing-processing method including the steps of sequentially forming a judgment as to whether or not a program stored in the first recording medium and specified to undergo high-speed dubbing is an object of high-speed-dubbing prohibition, assigning pending status to high-speed dubbing of a program stored on the first recording medium, specified to undergo high-speed dubbing and judged to be an object of high-speed-dubbing prohibition and implementing high-speed dubbing of a program stored on the first recording medium, specified to undergo high-speed dubbing and judged to be not an object of high-speed-dubbing prohibition in the past on a priority basis, forming a judgment as to whether or not all programs each stored on the first recording medium and judged to be not an object of high-speed-dubbing prohibition have each completed high-speed dubbing to the second recording medium, and recording programs each stored on the first recording medium and judged to be an object of high-speed-dubbing prohibition onto the second recording medium starting with one of the programs having the lapse of the predetermined period of time completed upon completion of the high-speed dubbing of all programs each stored on the first recording medium and judged to be not an object of high-speed-dubbing prohibition to the second recording medium.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 4 is an explanatory diagram showing a data structure of U-TOC (Table of Contents) sector 0 for storing management information of a writable recording medium MD;

FIG. 6 is an explanatory diagram showing a data structure of a frame of a playback-only medium CD;

FIG. 7A is an explanatory diagram showing a data structure of a block of a playback-only medium CD;

FIG. 7B is an explanatory diagram showing a data structure of a Q channel in sub-code information recorded on a playback-only medium CD;

FIG. 8A is an explanatory diagram showing a data structure for a case in which data of the Q channel shown in FIG. 7B is recorded in a lead-in area;

FIG. 8B is an explanatory diagram showing a data structure for a case in which data of the Q channel shown in FIG. 7B is recorded in a track area and a lead-out area;

FIG. 9 is a diagram showing data included in a TOC recorded in a lead-in area of a playback-only medium CD;

FIG. 11 is a diagram showing a table of the alphabetical characters and their corresponding numerical codes expressed in binary and octal formats;

FIG. 16A is a diagram showing a table of cataloged data recorded in an HCMS management table memory prior to the start of dubbing;

FIG. 16B is a diagram showing a table of cataloged data recorded in the HCMS management table memory after completion of high-speed dubbing of a first track Tr1;

FIG. 16C is a diagram showing a table of cataloged data recorded in the HCMS management table memory after completion of high-speed dubbing of a third track Tr3;

FIG. 16D is a diagram showing a table of cataloged data recorded in the HCMS management table memory after completion of high-speed dubbing of fifth to tenth tracks Tr5 to Tr10;

FIG. 16E is a diagram showing a table of cataloged data recorded in the HCMS management table memory after completion of high-speed dubbing of a second track Tr2;

FIG. 19 is a diagram showing a pointer table and a management table in U-TOC sector 0 prior to a track rearrangement process;

FIG. 20 is a diagram showing the pointer table and the management table in U-TOC sector 0 after the track rearrangement process.

DESCRIPTION OF THE PREFERRED EMBODIMENTS

Some preferred embodiments of the present invention are described by referring to the accompanying diagrams as follows. In the dubbing apparatuses implemented by the embodiments, audio data can be played back from a CD, and recorded onto an MD as well as played back from the MD.

The present invention is exemplified by using a recording & playback apparatus functioning as a CD/MD compound machine with a configuration allowing the so-called a dubbing recording process to record audio data played back from a CD onto an MD.

The embodiments are described in the following order:
1: Configuration of the Dubbing Apparatus
2: MD Track Format
3: U-TOC
4: Sub-codes and a TOC of a CD
5: Typical HCMS Management Operations of the Embodiment
6: Dubbing Operations of the Embodiments
6-1: First Implementation
6-2: Second Implementation
1: Configuration of the Dubbing Apparatus The description begins with an explanation of the configuration of an MD/CD compound machine, which is a dubbing apparatus of FIG. 2 implemented by an embodiment of the present invention.

Figure 1A:
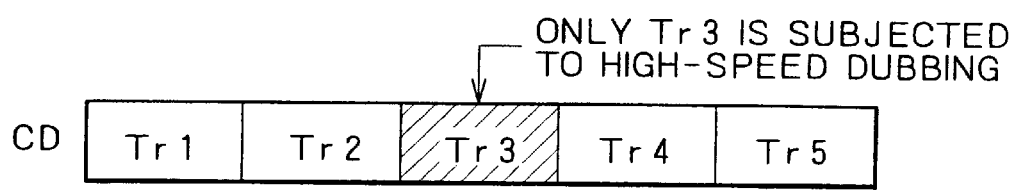
FIG. 1A is a model diagram showing a process to dub only a track Tr3 among tracks stored in a playback-only recording medium CD serving as a source of dubbing at a high speed.
Figure 1B:
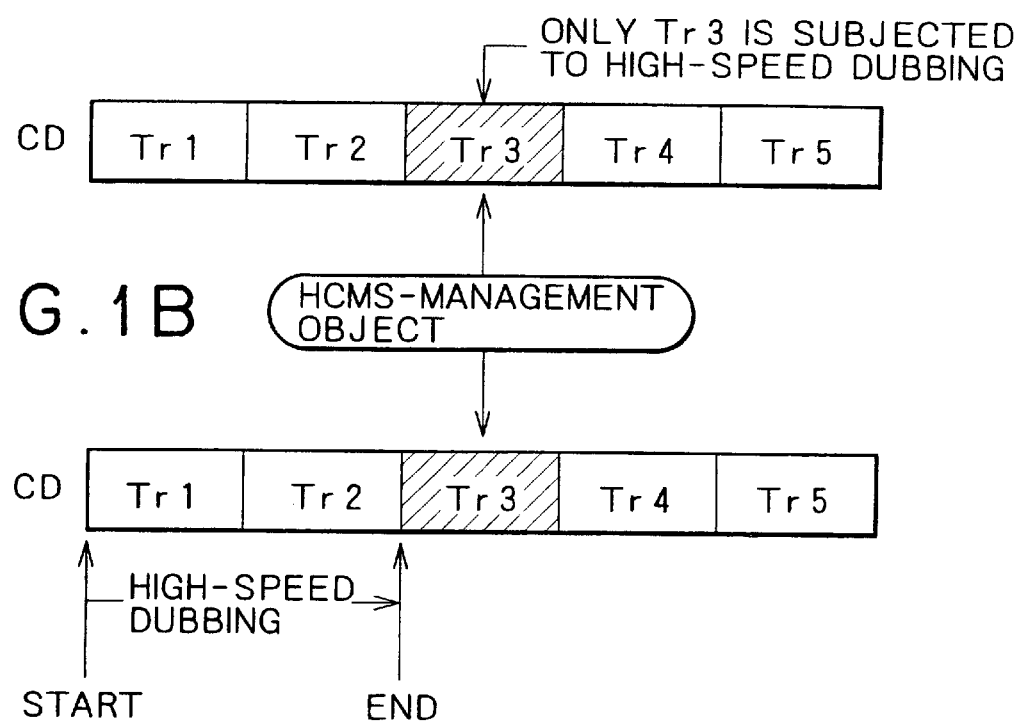
FIG. 1B is a model diagram showing a process to dub all the tracks stored in the playback-only recording medium CD serving as a source of dubbing at a high speed following the high-speed dubbing shown in FIG. 1A.
Figure 2:
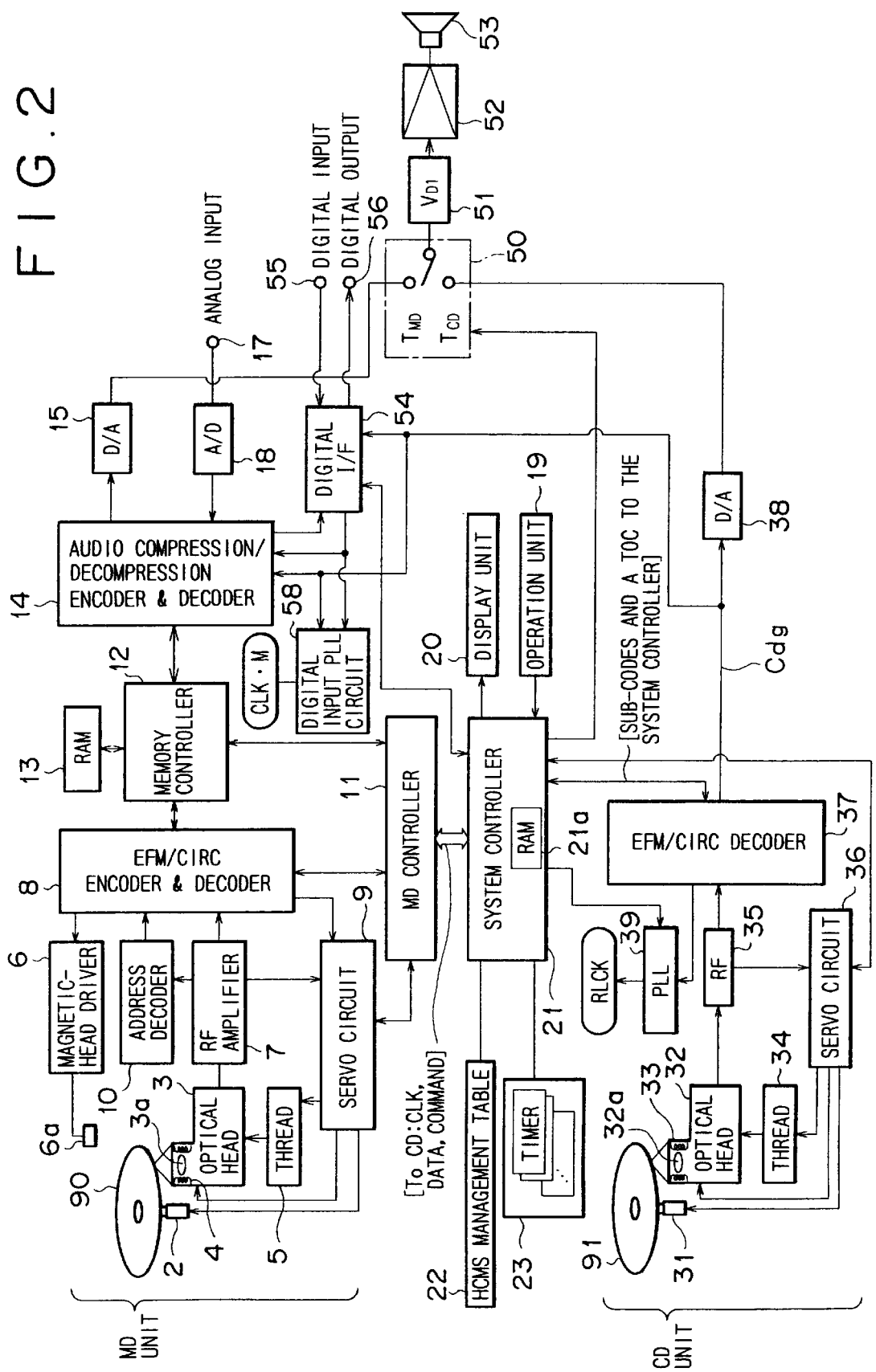
FIG. 2 is a block diagram showing a dubbing apparatus provided by the present invention.

FIG. 2 is a block diagram showing the dubbing apparatus provided by the present invention. In the dubbing apparatus shown in the figure, an MD 90 is mounted on an MD unit for recording and playing back data onto and from the MD 90, which is an MO (Magnetic Optical) disc.

The MD 90 is used as media allowing audio data to be recorded thereon. The MD 90 is driven into rotation by a spindle motor 2 during a recording or playback operation.

An optical head 3 radiates a laser beam to the MD 90 implemented by a magnetic optical disc during a recording or playback operation to serve as a recording or playback head respectively. To put it in detail, during a recording operation, the optical head 3 outputs a laser at a high level for heating a recording track to the Currie temperature. In a playback operation, on the other hand, the optical head 3 outputs a laser at a relatively low level for detecting data from a light reflected by the optical head 3 due to a magnetic Kerr effect.

For the above reason, the optical head 3 is equipped with an optical system and a detector for detecting a reflected light. The optical system includes a laser diode, a polarization beam splitter and an objective lens 3a. The objective lens 3a is held by a 2-axis mechanism 4 movably in directions toward and away from the optical head 3. A thread mechanism 5 holds the optical head 3 as a whole movably in the radial direction of the MD 90.

A magnetic head 6a is held at a counterpart position of the optical head 3 on the other side of the MD 90. The magnetic head 6a applies a magnetic field modulated by data supplied thereto to the MD 90.

The thread mechanism 5 moves the magnetic head 6a in the radial direction along with the optical head 3.

In a playback operation, information detected by the optical head 3 from a beam reflected by the MD 90 is supplied to an RF amplifier 7. The RF amplifier 7 processes the information supplied thereto, extracting a playback RF signal, a tracking-error signal, a focus-error signal, groove information and the like. The groove information is absolute-location information recorded as wobbles created at predetermined intervals on a groove, which is a recording track on the MD 90. The extracted playback RF signal is supplied to an EFM/CIRC encoder & decoder unit 8.

The tracking-error and focus-error signals are supplied to a servo circuit 9 whereas the groove information is fed to an address decoder 10 to be demodulated. Address information obtained as a result of the decoding process carried out by the address decoder 10, address information included in the playback RF signal as data and obtained as a result of a decoding process carried out by the EFM/CIRC encoder & decoder unit 8, sub-code information and other information are supplied to an MD controller 11 to be used in various kinds of control. The MD controller 11 is a microcomputer.

It should be noted that the MD controller 11 functions as a member for executing the various kinds of control in the MD unit.

The servo circuit 9 generates a variety of servo-driving signals in accordance with the tracking-error and focus-error signals received from the RF amplifier 7, a track-jump command and an access command received from the MD controller 11 and rotational-speed detection information of the spindle motor 2. The variety of servo-driving signals are used to execute focus control and tracking control by controlling the 2-axis mechanism 4 and the thread mechanism 5, and used to control the spindle motor 2 to a constant linear velocity.

In the EFM/CIRC encoder & decoder unit 8, the playback RF signal is subjected to EFM (Eight-Fourteen Modulation) demodulation and a decoding process such as a CIRC (Cross Interleave Reed Solomon Coding) decoding process before being temporarily stored by a memory controller 12 in a buffer memory 13. It should be noted that playback data is read out by the optical head 3 from the MD 90 and transferred from the optical head 3 to the buffer memory 13 intermittently at a transfer speed of 1.41 Mbit/sec.

The playback data stored in the buffer memory 13 is read back with timings corresponding to a transfer speed of 0.3 Mbit/sec and supplied to an audio compression/decompression encoder & decoder unit 14 in which the playback data is subjected to playback-signal processing such as a decoding process serving as a counterpart of audio compression and 16-bit quantization, being converted into digital audio data at a sampling rate of 44.1 KHz. The digital audio data is then supplied to a D/A converter 15 for converting the data into an analog audio signal, which is subsequently supplied to a terminal TMD of a switch circuit 50.

In a playback operation of the MD 90, a system controller 21 for controlling the operation of the dubbing apparatus as a whole executes control to set the switch circuit 50 at the terminal TMD. Thus, a playback audio signal obtained as a result of conversion of a signal output by the audio compression/decompression encoder & decoder unit 14 into an analog audio signal by means of the D/A converter 15 is supplied to a speaker 53 by way of the switch circuit 50, a volume adjustment unit 51 and a power amplifier 52. The speaker 53 finally outputs the playback audio signal as an output sound.

It should be noted that operations to write and read out playback audio data into and from the buffer memory 13 are carried out by the memory controller 12 by controlling respectively a write pointer and a read pointer, which each specify an access address in the buffer memory 13. By making the bit rate of the write operation greater than the bit rate of the read operation as described above, the buffer memory 13 can be kept always in an equilibrium state with data left therein at an amount fixed to a certain degree. Since the write operation is carried out intermittently, however, the playback audio data does not overflow the buffer memory 13.

By outputting a playback audio signal through the buffer memory 13 in this way, the operation to output the playback audio signal is never suspended even if the optical head 3 gets out off the recording track due to typically an external disturbance. This is because the optical head is restored to a correct position on the recording track before the playback audio data stored in the buffer memory 13 runs out so that an access can be made to data at the position to resume the operation to read out data from the CD 91. Thus, the playback operation can be continued without affecting the playback output. That is to say, the vibration-proof feature of the dubbing apparatus can be improved considerably.

In addition, the recording & playback apparatus also has a digital interface 54. Playback data produced by the audio compression/decompression encoder & decoder unit 14 as a result of decoding in the playback operation is also supplied to the digital interface 54. The digital interface 54 encodes the playback data by using, among others, sub-code information extracted during the playback operation to produce a data stream having a predetermined digital interface format. The data stream can be output to a digital output terminal 56 typically as an optical digital signal. That is to say, the playback data can be output to an external apparatus as digital data without being converted into an analog audio signal.

In an operation to record audio data onto the MD 90, an analog audio signal, which is a signal to be recorded, is supplied to an analog input terminal 17. The analog audio signal is converted by an A/D converter 18 into digital audio data with 16 quantization bits at a sampling rate of 44.1 KHz before being supplied to the audio compression/decompression encoder & decoder unit 14 for carrying out audio compression encoding process on the digital audio data to produce compressed digital audio data with the amount thereof reduced to about ⅕.

In addition, it is also possible to record data input through the digital interface 54 onto the MD 90. That is to say, a signal with a digital interface format supplied to a digital input terminal 55 by an external apparatus is decoded by the digital interface 54, which then extracts digital audio data, sub-codes and the like from the decoded signal. Control information of the sub-codes and the like is supplied to the system controller 21. On the other hand, the digital audio data with 16 quantization bits and a sampling rate of 44.1 KHz is supplied to the audio compression/decompression encoder & decoder unit 14 for carrying out audio compression encoding process on the digital audio data to produce compressed digital audio data with the amount thereof reduced to about ⅕.

Moreover, audio data played back from a CD 91 in the CD unit to be described later can also be recorded onto the MD 90 in an operation known as the so-called dubbing recording process. In this case, the audio data played back from the CD 91 and decoded by an EFM/CIRC decoder 37 into CD playback data cdg is supplied to the audio compression/decompression encoder & decoder unit 14 for carrying out audio compression encoding process on the CD playback data cdg to produce compressed digital audio data with the amount thereof reduced to about ⅕. The CD playback data cdg is digital audio data with 16 quantization bits and a sampling rate of 44.1 KHz.

A digital input PLL circuit 58 is a member for receiving digital audio data input through the digital interface 54 or CD playback data cdg output by the CD unit to be described later and for generating a clock signal CLK.M synchronized to a synchronization signal inserted into the input data. The clock signal CLK.M has a predetermined frequency equal to a multiple of typically a base frequency fs of 44.1 KHz.

The frequency of the clock signal CLK.M is further multiplied or divided to generate a desired frequency. In an operation to record data supplied to the MD unit as digital data onto the MD 90, a signal with the desired frequency can be used at least as a clock signal for signal processing carried out by the audio compression/decompression encoder & decoder unit 14 or for transfers of input or output data.

To-be-recorded data compressed by the audio compression/decompression encoder & decoder unit 14 is stored by the memory controller 12 temporarily into the buffer memory 13. The data is read back from the buffer memory 13 and supplied to the EFM/CIRC encoder & decoder unit 8. In the EFM/CIRC encoder & decoder unit 8, the data is subjected to a CIRC (Cross Interleave Reed Solomon Coding) encoding process and an encoding process such as the EFM demodulation before being supplied to a magnetic-head-driving circuit 6.

The magnetic-head-driving circuit 6 supplies a magnetic-head-driving signal representing the to-be-recorded data completing the encoding processes in the EFM/CIRC encoder & decoder unit 8 to the magnetic head 6a. The magnetic-head-driving signal supplied to the magnetic head 6a applies a magnetic field of magnetic N and S poles to the MD 90. At that time, the MD controller 11 supplies a control signal to the optical head 3, driving the optical head 3 to generate a laser beam at a high recording level.

By the way, in operations to record and play back data onto and from the MD 90, it is necessary to read out management information, that is, a P-TOC (Pre-mastered Table of Contents) and a U-TOC (User TOC), from the MD 90 in advance. From the management information, the MD controller 11 identifies an address of an area on the MD 90 to which data is to be recorded and an address of an area on the MD 90 from which data is to be read out. The management information read out from the MD 90 is stored in the buffer memory 13. The buffer memory 13 is thus divided into a buffer area for storing data to be recorded or playback data, and a TOC area for storing the management information.

The MD controller 11 reads out the management information by execution of an operation to play back the information from the innermost circumference of the MD 90 in advance when the MD 90 is mounted on the MD unit for the first time, and stores the management information in the buffer memory 13. The innermost circumference is a recording area dedicated to the management information. The management information can be referenced in later operations to record and play back data onto and from the MD 90.

The U-TOC can be edited and updated in accordance with an operation to record or erase data onto or from the MD 90. The MD controller 11 edits the U-TOC stored in the buffer memory 13 each time data is recorded or erased onto or from the MD 90. The MD controller 11 then stores the edited U-TOC into a U-TOC area on the MD 90 with a predetermined timing.

The recording & playback apparatus further has a playback system for the CD 91, which serves as a playback-only optical disc.

The CD 91 is mounted on the CD unit for playing back data from the CD 91.

The spindle motor 31 drives the CD 91 into rotation at a constant linear velocity (CLV). The optical head 32 reads out data recorded on the CD 91 in a PIT format and supplies the data to an RF amplifier 35. An objective lens 32a employed in the optical head 32 is held by a 2-axis mechanism 33 movably in the tracking and focus directions.

The thread mechanism 34 holds the optical head 32 movably in the radial direction of the CD 91.

Besides a playback RF signal, the RF amplifier 35 also generates a focus-error signal and a tracking-error signal, supplying these error signals to a servo circuit 36.

From the focus-error and tracking-error signals, the servo circuit 36 generates a variety of driving signals such as a focus-driving signal, a tracking-driving signal, a thread-driving signal and a spindle-driving signal for controlling operations of the 2-axis mechanism 33, the thread mechanism 34 and the spindle motor 31.

The playback RF signal is supplied to the EFM/CIRC decoder 37. In the EFM/CIRC decoder 37, first of all, the playback RF signal is subjected to binary conversion to generate an EFM signal. The EFM signal is then subjected to processes such as EFM demodulation and a CIRC decoding process for decoding the information read out from the CD 91 into digital audio data with 16 quantization bits decoded at a sampling rate of 44.1 KHz.

The EFM/CIRC decoder 37 is also capable of extracting control data such as a TOC (Table of Contents) and sub-codes, and supplies the TOC and the sub-codes to the system controller 21 for use in various kinds of control.

The EFM signal obtained as a result of the binary conversion carried out by the EFM/CIRC decoder 37 is also supplied to a PLL circuit 39.

The PLL circuit 39 outputs a clock signal PLCK synchronized to channel bits of the EFM signal received from the EFM/CIRC decoder 37. At the ordinary one-time speed, the frequency of the clock signal PLCK is 4.3218 MHz. The clock signal PLCK is used as a clock signal for typically signal-processing circuits at stages succeeding the EFM/CIRC decoder 37.

The digital audio data output by the EFM/CIRC decoder 37 is converted in a D/A converter 38 into an analog audio signal, which is supplied to the switch circuit 50. In a playback operation of the CD 91, the system controller 21 executes control to set the switch circuit 50 at the terminal TCD. Thus, a playback audio signal obtained as a result of conversion of a signal output by the EFM/CIRC decoder 37 into an analog audio signal by means of the D/A converter 38 is supplied to the speaker 53 by way of the switch circuit 50, the volume adjustment unit 51 and the power amplifier 52. The speaker 53 finally outputs the playback audio signal as an output sound.

In this embodiment, the CD playback data can be dubbed and recorded onto the MD 90. In this case, the digital audio data output by the EFM/CIRC decoder 37 is supplied to the audio compression/decompression encoder & decoder unit 14 as it is.

In addition, the digital audio data output by the EFM/CIRC decoder 37 can also be supplied to the digital interface 54 for outputting CD playback data cdg having a digital format to an external apparatus by way of the digital output terminal 56.

In an operation to play back data from the CD 91, it is necessary to read out management information, that is, a TOC, from the CD 91 in advance. From the management, the system controller 21 identifies, among others, the number of tracks recorded on the CD 91 and the address of each of the tracks, which are used for controlling the playback operations. The system controller 21 reads out the management information included in the TOC by execution of an operation to play back information from the innermost circumference of the CD 91 in advance when the CD 91 is mounted on the CD unit for the first time, and stores the TOC typically in an internal RAM 21a employed in the system controller 21. The innermost circumference is a recording area dedicated to the management information. The management information included in the TOC can be referenced in later operations to record and play back data onto and from the CD 91.

The system controller 21 is implemented by a microcomputer for controlling the dubbing apparatus as a whole. The system controller 21 gives a variety of commands to the MD controller 11 in order to request the MD controller 11 to execute control of the operations of the MD unit. In an operation to record or play back data onto or from the MD 90, the system controller 21 receives management information such as sub-codes from the MD controller 11.

As for the CD unit, the system controller 21 typically executes direct control of operations thereof.

The internal RAM 21a employed in the system controller 21 is a memory for temporarily storing various kinds of information required in execution of necessary processing by the system controller 21.

In this embodiment, the system controller 21 issues a variety of commands to the MD controller 11 in accordance with a clock signal CLK with a predetermined frequency based on the frequency of the PCLK signal obtained in the CD unit, various kinds of data and typically the state of a playback operation underway in the CD unit. It should be noted that the various kinds of data include the TOC and the sub-codes obtained in a CD playback operation.

In addition, in this embodiment, an HCMS-management-table memory 22 and a timer unit 23 are provided for the system controller 21. The HCMS-management-table memory 22 and the timer unit 23 are used in the execution of the HCMS management.

The HCMS-management-table memory 22 can be implemented typically by an EEPROM (Electrically Erasable Programmable Read Only Memory) or a RAM (Random Access Memory). The HCMS-management-table memory 22 implemented by a memory device such as an EEPROM can be used as a non-volatile memory for storing for example a cataloged track to be described later and a timer time measured by the timer unit 23 for the track. A non-volatile memory is capable of sustaining data stored therein even if, for example, the dubbing apparatus is reset or the power supply is turned off. In addition, a predetermined storage area in the internal RAM 21a in the system controller 21 can be allocated to such a table instead of employing a separate RAM as the HCMS-management-table memory 22.

It should be noted that HCMS-management operations using the HCMS-management-table memory 22 and the timer unit 23 will be described later. The HCMS management is various kinds of information management and operation control for implementing operations to restrict dubbing in accordance with HCMS regulations.

It should be noted that such an implementation of the control system is typical. As an alternative, it is also possible to provide a CD controller for executing control on the CD unit. In addition, the system controller 21 and the MD controller 11 can also be implemented in an integrated unit.

An operation unit 19 includes a recording key, a stop key, an AMS (Auto Music Sensor) key, a search key and a dubbing key, which can be operated by the user to carry out operations to record and play back musical data onto and from the MD 90 or the CD 91. The dubbing key is operated to set ordinary-speed dubbing or high-speed dubbing.

By operating the operation unit 19, it is also possible to enter a string of characters to be recorded as additional data onto the MD 90, to confirm the cataloging of the string of characters and to set a cataloging mode.

Operation information generated by the operation unit 19 is supplied to the system controller 21. The system controller 21 drives other components to carry out necessary operations by execution of an operating program in accordance with the operation information.

It should be noted that the operation unit 19 may include an additional remote-operation function for executing an operation in accordance with a command issued by typically an infrared-ray remote commander.

A display unit 20 carries out a necessary operation to display information such as a playback time and a recording time of the MD 90 and the CD 91. In addition, the system controller 21 also displays various kinds of information including information on time such as a total performance time and lapse times of playback and recording operations, a track number and an operating mode on the display unit 20.

Thus, the recording & playback apparatus having the configuration described above is capable of carrying out an MD playback operation, an MD recording operation, a CD playback operation and a dubbing operation from the CD 91 to the MD 90.

In particular, a dubbing operation from the CD 91 to the MD 90 carried out by this embodiment may be a normal-speed dubbing operation performed at the ordinary one-time speed or a high-speed dubbing operation performed at a predetermined multiple or an N-time speed higher than the normal one-time speed where N is an integer $\geq 2$.

In a high-speed dubbing operation, first of all, a servo circuit 36 employed in the CD unit drives the spindle motor 31 at a CLV equivalent to the N-time speed equal to N times the normal one-time speed where N is an integer $\geq 2$. In this state, data is played back from the CD 91. Assume that N is 2. In this case, the PLL circuit sets a clock frequency at 2×4.3218 MHz=8.6436 MHz, which is equal to 2 times the clock frequency at the normal 1-time speed, as a target value of a locked state corresponding to the 2-time speed. It should be noted that the system controller 21 controls a switching operation to change the target value for the PLL circuit 39.

With the PLL circuit 39 put in a locked state as described above, the CD 91 is controlled to a stable rotation at a 2-time CLV and the EFM/CIRC decoder 37 as well as the D/A converter 38 are carrying out normal processing at a 2-time speed.

Then, by carrying out the processing at the 2-time speed in this way, CD playback data cdg with 16 quantization bits and a sampling rate of 88.2 KHz (=2×44.1 KHz) is transferred to the audio compression/decompression encoder & decoder unit 14 employed in the MD unit at a transfer rate 2 times that for the normal 1-time speed.

The CD playback data cdg is also supplied to a digital input PLL circuit 58 employed in the MD unit at the 2-time transfer rate. The digital input PLL circuit 58 sets a clock frequency equal to 2 times the clock frequency at the normal 1-time speed as a target value of a locked state corresponding to the 2-time speed. It should be noted that the MD controller 11 controls a switching operation to change the target value for the digital input PLL circuit 58 in accordance with a command issued by the system controller 21.

With the digital input PLL circuit 58 put in a locked state as described above, a clock frequency equal to 2 times the clock frequency at the normal 1-time speed is obtained as the frequency of the clock signal CLK.M. With timings set by the clock signal CLK.M, the audio compression/decompression encoder & decoder unit 14 carries out signal compression processing and transfers data to the memory controller 12. As a result, it is possible to carry out processing of the signal to be recorded in synchronization with the CD playback data received from the CD unit at a 2-time transfer rate.

The operation by the EFM/CIRC encoder & decoder unit 8 to read out data from the buffer memory 13, signal processing by the EFM/CIRC encoder & decoder unit 8 and all other processing in the MD unit including an operation to record the data onto the MD 90 are carried out with operation timings set by properly using a master clock signal generated by the MD controller 11 or a clock signal or the like obtained during rotation control based on a wobble period formed on the MD 90.

As is obvious from the previous description, during a recording operation in the MD unit, data is read out from the buffer memory 13 and recorded into the MD 90 at a speed higher than a speed to write data into the buffer memory 13. Thus, data must be read out from the buffer memory 13 and recorded into the MD 90 intermittently to sustain the buffer memory 13 always in an equilibrium state with data left therein at an amount fixed to a certain degree. To put it in detail, when the amount of data stored in the buffer memory 13 exceeds a predetermined value, data is written onto the MD 90. As the operation to write data onto the MD 90 makes the amount of data stored in the buffer memory 13 smaller than a predetermined value or equal to 0, the write operation is put in a wait state till the amount of data stored in the buffer memory 13 is restored to the predetermined value allowing the write operation to be resumed. These operations are carried out repeatedly.

For the reason described above, it is not necessary to set the driven-rotation speed of the MD 90, the transfer rate of data input to and output from the EFM/CIRC encoder & decoder unit 8 and the signal processing speed at respective values for the N-time-speed dubbing, that is, at respective values corresponding to the N-time speed in the CD unit.

Assume that, during the N-time-speed dubbing, the driven-rotation speed of the MD 90, the transfer rate of data input to and output from the EFM/CIRC encoder & decoder unit 8 and the signal processing speed at respective values corresponding to the 1-time speed in the CD unit. In this case, the wait state of the operation to write data onto the MD 90 is merely shortened or the write operation is carried out continuously instead of intermittently to record the data onto the MD 90 properly.

It should be noted, however, that, the driven-rotation speed of the MD 90, the transfer rate of data input to and output from the EFM/CIRC encoder & decoder unit 8 and the signal processing speed can also be set at respective values corresponding to a predetermined-N-time speed in the CD unit in dependence on conditions including typically the capacity of the buffer memory 13.

2: MD Track Format

The following description explains a cluster format of the recording data track on the magnetic optical disc (MD) 90.

Data is recorded into a magnetic optical disc in a mini-disc system in cluster units. The format of a cluster is explained by referring to FIGS. 3A to 3E.

Figure 3A:
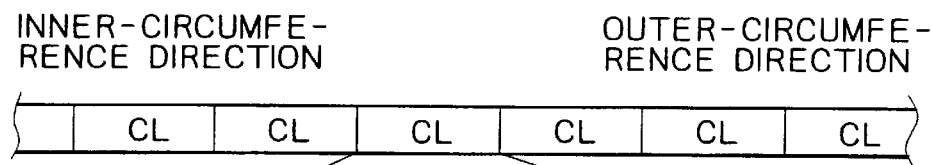
FIG. 3A is an explanatory diagram showing a data structure used for describing clusters, which are each a recording unit of a writable recording medium MD.

An entire recording track in a mini-disc system is a contiguous sequence of clusters (CL) shown in FIG. 3A. A cluster is a minimum recording unit. 1 cluster corresponds to 2 to 3 circular tracks.

Figure 3B:
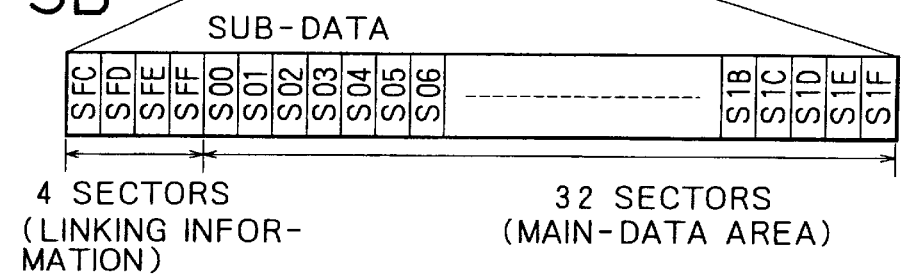
FIG. 3B is an explanatory diagram showing a data structure used for describing sectors composing a cluster.

Each of the sectors comprises a sub-data area consisting of 4 sectors SFC to SFF and a main-data area consisting of 32 sectors S00 to S1F as shown in FIG. 3B. In the case of an audio system, the main data is audio data compressed in ATRAC (Adaptive TRansform Acoustic Coding) processing.

Used as a data unit, a sector is 2,352 bytes in length.

The 4-sector sub-data area is used for storing sub-data or used as a linking area. On the other hand, the 32-sector main-data area is used for storing main data and TOC data. Since the interleave length of the CIRC technique adopted this time is greater than a sector length of 13.3 msec of a CD and the like, the sectors of the linking area are to-be-discarded sectors provided for the sake of consistency so that the sectors are basically used as a reserved area. The sectors can also be used for recording some pieces of processing and some control data.

It should be noted that an address is assigned to each sector.

A sector is further divided into finer units each referred to as a sound group. To put it in detail, 2 sectors comprise 11 sound groups as shown in FIGS. 3C and 3D.

Figure 3C:
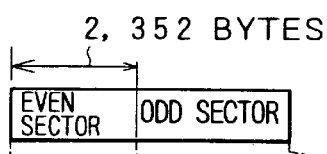
FIG. 3C is an explanatory diagram showing a data structure used for describing a sound group.
Figure 3D:
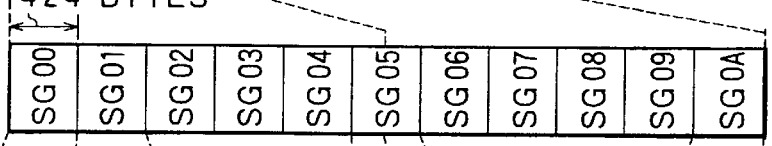
FIG. 3D is an explanatory diagram showing a data structure used for describing a sound group.

That is to say, 2 adjacent sectors, that is, an even sector such as a sector S00 and an odd sector such as a sector S01, include 11 sound groups SG00 to SG0A as shown in FIGS. 3C and 3D. A sound group SG consists of 424 bytes for accommodating compressed audio data of an amount corresponding to a time duration of 11.61 msec.

Figure 3E:
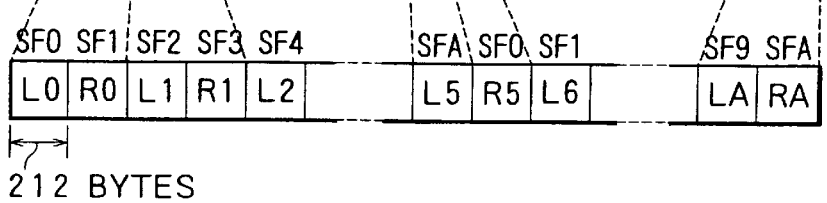
FIG. 3E is an explanatory diagram showing a data structure used for describing a sound frame.
Figure 5:
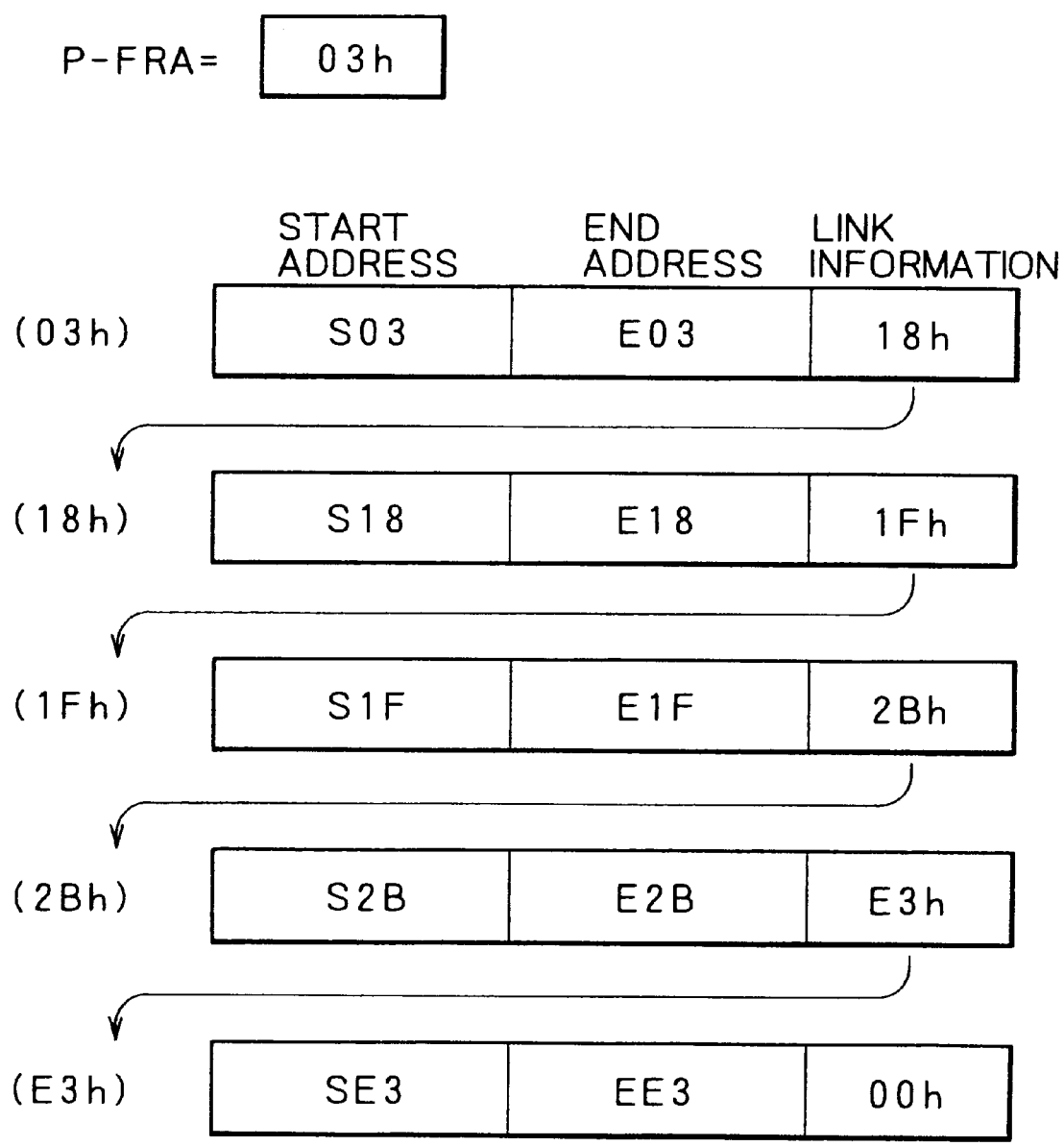
FIG. 5 is a model diagram showing a method of linking discrete writable recording areas on a writable recording medium MD.

As shown in FIGS. 3D and 3E, a sound group SG is divided into an area for recording left-channel data and an area for recording right-channel data. For example, the sound group SG00 is used for recording left-channel data L0 and right-channel data R0 whereas the sound group SG01 is used for recording left-channel data L1 and right-channel data R1.

It should be noted that the area for recording right-channel or left-channel data is 212 bytes in length and referred to as a sound frame.

3: U-TOC

Clusters are spread over the entire area of a magnetic optical disc (MD) 90 in a format shown in FIGS. 3A to 3E. The area of the MD 90 can also be viewed as an area comprising circumferences spread in the radial direction of the MD 90. In this case, the innermost circumferences are a management area and the remaining circumferences are a program area following the management area.

It should be noted that the innermost circumferences include a playback-only area for recording playback-only data by phase pits, and a magnetic optical area following the playback-only area. The magnetic optical area allows magnetic optical recording and playback operations to be carried out. The management area described above covers the playback-only area and the innermost circumference of the magnetic optical area.

Thus, the magnetic optical area comprises a portion of the management area and a portion of the program area following the management area. The program area includes a main-data area, which is a recordable user area. Each sector in this main-data area is used for recording audio data.

The playback-only area of the management area is used for storing a P-TOC (Pre-mastered TOC) utilized for controlling the entire area of the disc. The innermost circumference of the magnetic optical area in the management area is used for storing a U-TOC (User Table of Contents). The U-TOC is an information list for controlling programs recorded in the program area.

The following description explains a U-TOC sector for storing management information used for controlling operations to record and play back tracks onto and from the MD 90.

FIG. 4 is an explanatory diagram showing a data structure of U-TOC sector 0 for storing management information of a writable recording medium MD.

It should be noted sectors 0 to 31 can be used as U-TOC sectors. That is to say, sectors S00 to S1F of 1 cluster in the management area can all be used as U-TOC sectors. Normally, sectors 1 and 4 are used for storing character information. Sector 2 is used as an area for storing a recording date and a recording time.

U-TOC sector 0 is a data area for recording mainly management information on tracks recorded by the user and management information on free areas available for newly recording additional tracks. Management information recorded in U-TOC sector 0 includes the start address, the end address, copyright information and emphasis information of each program. The copyright information of a program can also be regarded as a characteristic of the program or a track mode.

In an attempt made to record a track onto the MD 90, for example, the system controller 21 searches U-TOC sector 0 for a free area on the MD 90 and records the audio data of the track into the free area. In a playback operation, the area for recording a piece of music to be played back is identified from U-TOC sector 0. Then, an access to the area is made to carry out the playback operation.

As shown in FIG. 4, U-TOC sector 0 has a header at the beginning thereof. The header comprising 12 bytes serves as a synch pattern.n The header is followed by data of 3 bytes, namely, "Cluster H", "Cluster L" and "Sector," which are used for storing the address of this sector. Data following these 3 bytes includes a maker code, a model code, "First TNO", "Last TNO", sector use condition "used sector", "disc serial No" and a disc ID. "First TNO" and "Last TNO" are the numbers of the first and last programs respectively.

The disc ID is followed by a pointer for defective areas P-DFA showing the position of a start table slot (part entry) used for storing information on a location of a defect generated on the MD 90. The pointed P-DFA is followed by a pointer for empty slots P-EMPTY showing the position of a first empty table slot. The pointer P-EMPTY is followed by a pointer for free areas P-FRA showing the position of a start table slot used for storing information on a location of a free area. The pointer P-FRA is followed by track-number pointers P-TNO1, P-TNO2, ... and P-TNO255, which each show a start table slot used for storing information on a program. Then, the disc ID through P-TNO255 constitute a corresponding-table pointer data portion.

U-TOC sector 0 is ended with a management table comprising 255 table slots each having a length of 8 bytes. Each table slot contains a start address, an end address, a track mode and link information.

In the case of the magnetic optical disc 90 provided by the present embodiment, data may not be necessarily recorded in a contiguous area on the disc 90. That is to say, a sequential array of data can be recorded in a plurality of discrete parts on the recording medium 90. A part is a portion of data continuous along the time axis that is recorded in a physically contiguous cluster.

In the recording & playback unit or the MD unit for recording and playing back data onto and from the disc 90, data is stored temporarily in the buffer memory 13 as described above. Sequential accesses to pieces of data stored in discrete recording areas on the disc 90 are made intermittently by using the optical head 3 to store the data into the buffer memory 13. By properly adjusting the rate of transfer from the disc 90 to the buffer memory 13 and the transfer rate of the operation to read out data back from the buffer memory 13, the original sequential array of data can be restored as playback data.

To put it in detail, since the transfer rate of the operation to intermittently write data into the buffer memory 13 is higher than the transfer rate of the operation to read the data back from the buffer memory 13, a continuous playback operation of audio data can be carried out without any disturbance.

In addition, when a program shorter than an already recorded program is recorded to overwrite the already recorded program, the leftover area can be specified as a recordable area controlled by using the pointer P-FRA without the need to delete a portion of the already recorded program occupying the leftover area. Thus, the recording area can be used efficiently.

The following description explains a technique to link available discrete areas by using the pointer P-FRA for managing recordable areas with reference to FIG. 4.

Assume that the pointer P-FRA showing the position of a start table slot used for storing information on a location of a free area is set at 03h where the suffix h indicates that the number is expressed in the hexadecimal format. The number 03h is the number of a slot in the management table portion comprising 255 table slots. In slot 03h, data is stored.

The data stored in slot 03h is the start and end addresses of a part, which can be used as an available recording area on the disc 90. Thus, the start and end addresses represent the locations of the beginning and the end of the part.

The data stored in slot 03h also includes link information. The link information is the number of a next slot, which is 18h in this example. The data stored in slot 18h is the start and end addresses of a next part, which can be used as an available recording area on the disc 90 following the part described by a slot 03h.

The data stored in slot 18h also includes link information. The link information is the number of a next slot, which is 2Bh in this example. The data stored in slot 2Bh is the start and end addresses of a next part, which can be used as an available recording area on the disc 90 following the part described by a slot 18h.

In this way, slots each containing the start and end addresses of an available recording area on the disc 90 are linked to each other by using pieces of link information. The number of the first slot on such a link for managing all parts each usable as a recording area is indicated by the pointer P-FRA whereas the last slot contains link information of 00h.

By tracing the link starting with a slot indicated by the pointer P-FRA to the last slot containing link information of 00h, the discrete parts on the disc 90 can be treated like linked areas on the disc 90. In this way, a recordable part on the disc can be distinguished from a part, in which data has already been recorded.

In the above description, the pointer P-FRA is used to exemplify a technique to link discrete parts on the disc 90. It should be noted that the other pointers P-DFA, P-EMPTY, P-TNO1, P-TNO2, . . . and P-TNO255 are used for indicating a first slot on a link of discrete parts of different types in the same way as the pointer P-FRA.

4: Sub-codes and a TOC of a CD

Next, sub-codes and a TOC recorded on the CD 91 are explained.

The TOC is recorded in the so-called lead-in area and sub-codes are inserted into data as described later.

A frame is the smallest unit of data recorded on a disc having the CD format. 98 frames constitute a block.

The structure of a frame is shown in FIG. 6.

As shown in the figure, 1 frame consists of 588 bits. The first 24 bits are synchronization data, which is followed by a 14-bit sub-code data area. The sub-code data area is followed by a sequence of data and a parity bit for the data.

As described above, 98 frames each having the above configuration constitute 1 block. Pieces of sub-code data each extracted from a frame are collected to form block sub-code data shown in FIG. 7A.

Pieces of sub-code data extracted from the first and second frames of a block, that is, frames $98n+1$ and $98n+2$ shown in FIG. 7A, are a sync pattern. Pieces of sub-code data extracted from the third to 98th frames of the block, that is, frames $98n+3$ and $98n+98$ shown in FIG. 7A, are each 96-bit channel data. 96-bit channel data is P, Q, R, S, T, U, V and W sub-code data of a frame.

The P and Q channels are used for control such as access control. It should be noted, however, that the P channel merely shows a pose portion between tracks. Finer control is executed by using the Q channel (Q1 to Q96). The 96-bit Q-channel data has a format shown in FIG. 7B.

The 4 bits at the beginning of the Q-channel data, namely, Q1 to Q4, are control data used for indicating, among others, the number of audio channels, an emphasis, a CD-ROM identification and whether or not digital copying is possible.

The control data is followed by 4 bits Q5 to Q8, which are an address indicating the type of sub Q data.

The address is followed by 72 bits Q9 to Q80 serving as the sub Q data. The remaining bits Q81 to Q96 are CRC (Cyclic Redundancy Check) bits.

Thus, the lead-in area is used for storing sub Q data, that is, information in the TOC.

The sub Q data in the 72 bits Q9 to Q80 of the Q-channel data stored in the lead-in area has information shown in FIG. 8A. As shown in the figure, the sub Q data comprises pieces of data each having a length of 8 bits.

The piece of data at the beginning of sub Q data is a track number. The lead-in area is on a track with a number of 00.

The truck number is followed by POINT, which is further followed by MIN indicating time information in terms of minutes, SEC indicating time information in terms of minutes and a frame number.

The last 3 pieces of data are PMIN, PSEC and PFRAME which each have different meanings in dependence on the value of POINT.

A value of POINT set in the range 01 to 99 is a track number and indicates meanings of PMIN, PSEC and PFRAME as follows. The start point or the absolute time address of the track having a track number equal to the value of POINT is expressed in terms of minutes specified by PMIN, seconds specified by PSEC and a frame number specified by PFRAME.

A value of POINT set at A0 indicates that PMIN is the track number of the first track, and PSEC indicates CD-DA (Digital Audio) CD-I or CD-ROM (XA) specifications.

A value of POINT set at A1 indicates that PMIN is the track number of the last track.

A value of POINT set at A2 indicates that the start point or the absolute time address of the lead-out area is expressed in terms of minutes specified in PMIN, seconds specified in PSEC and a frame number specified in PFRAME.

Assume for example that 6 tracks have been recorded on the disc 90. In this case, sub Q data in the TOC has a structure shown in FIG. 9.

As shown in FIG. 9, all track numbers (TNOs) are set at 0.

A block number is the number of a unit of sub Q data read in as block data comprising 98 frames as described above. 3 consecutive blocks contain the same TOC data.

PMIN, PSEC and PFRAME for POINT having a value of On represent the start point of the nth track, namely, track #n, where n=1 to 6.

PMIN of POINT having a value of A0 is the track number 01 of the first track. In this case, PSEC identifies the disc. A PSEC value of 00 indicates that the disc is an ordinary audio CD. It should be noted that a PSEC value of 20 indicates that the disc is a CD-ROM conforming to the XA specifications and a PSEC value of 10 indicates that the disc is a CD-I.

PMIN of POINT having a value of A1 is the track number of the last track and PMIN, PSEC and PFRAME of POINT having a value of A2 is the start point of the lead-out area.

TOC data for block number n+27 and subsequent block numbers is the same as the TOC data for block numbers n to n+26.

Sub Q data recorded in the lead-out area and the program area for recording music data and the like as tracks #1 to #n includes information shown in FIG. 8B.

The piece of data at the beginning of sub Q data is a track number. A track number of n in the range 01 to 99 is track number #n. A track number of AA indicates the lead-out area.

The truck number is followed by an index representing a finer portion of the track.

The index is further followed by MIN and SEC, which represent the lapse of time of the track, and FRAME representing a frame number.

FRAME is further followed by AMIN, ASEC and AFRAME for expressing an absolute time address in terms of minutes, seconds and a frame number respectively.

In addition, as is generally known, the Q-channel data of a CD varies in dependence on whether the mode is mode 1, 2 or 3.

Figures 10A, 10B, 10C, 10D:
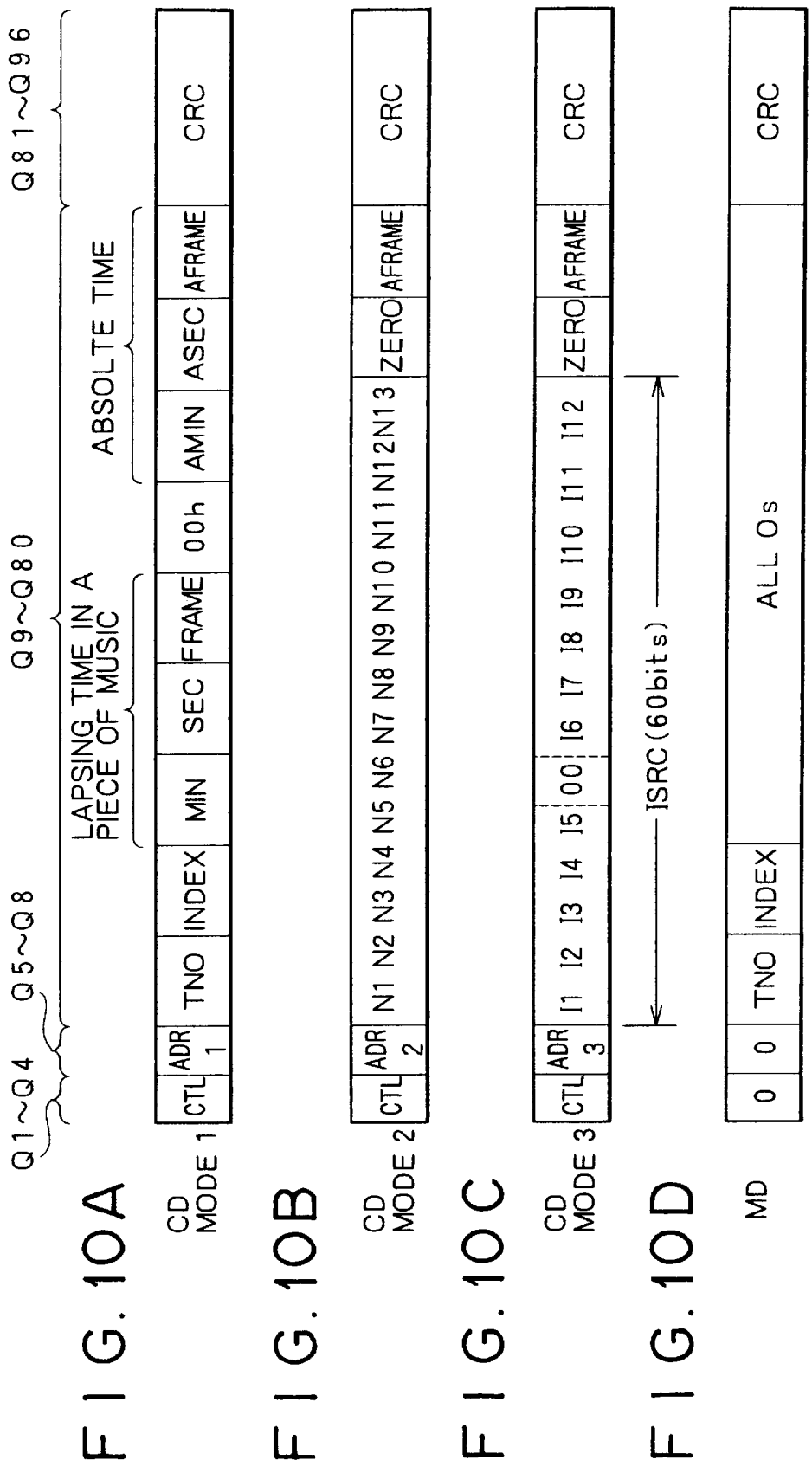
FIG. 10A is a diagram showing a data structure of the Q channel in mode 1 of a playback-only medium CD.
FIG. 10B is a diagram showing a data structure of the Q channel in mode 2 of a playback-only medium CD.
FIG. 10C is a diagram showing a data structure of the Q channel in mode 3 of a playback-only medium CD.
FIG. 10D is a diagram showing a data structure of the Q channel in a writable recording medium MD.

First of all, the Q-channel data of a CD for mode 1 is explained by referring to FIG. 10A.

The first 4 bits Q1 to Q4 shown in FIG. 10A are CTL for indicating, among others, the number of audio channels, an emphasis and a CD-ROM identification.

That is to say, the 4-bit control data is defined as follows:
0***—2-channel audio
1***—4-channel audio
*0**—CD-DA (CD digital audio data)
*1**—CD-ROM
**0*—Disabled digital copying
**1*—Enabled digital copying
***0—No pre-emphasis
***1—With pre-emphasis The control data CTL is set at a value representing the actual contents of the CD. The control data CTL Q1 to Q4 of the Q-channel data for modes 2 and 3 to be described later is set in the same way as mode 1.

The next 4 bits Q5 to Q8 are an address ADR, which is control bits indicating the type of the data Q9 to Q80.

For example, an ADR of 0001 or 1 when expressed in the hexadecimal format indicates that the following sub Q data Q9 to Q80 is Q data of an audio CD in mode 1.

The 72 bits Q9 to Q80 are sub Q data and the remaining bits Q81 to Q96 are a CRC code.

The sub data in the 72 bits Q9 to Q80 has information shown in FIG. 10A. As shown in the figure, the sub Q data comprises pieces of data each having a length of 8 bits.

The piece of data at the beginning of sub Q data is a track number TNO. A track number of n in the range 01 to 99 is track number #n. A track number of AA indicates the lead-out area.

The truck number is followed by an index representing a finer portion of the track.

The index is further followed by MIN and SEC, which represent the lapse of time of the track, and FRAME representing a frame number.

FRAME is further followed by AMIN, ASEC and AFRAME for expressing an absolute time address in terms of minutes, seconds and a frame number respectively. The absolute time address is continuous time information up to the lead-out area beginning at a start point of the first track, which is expressed by 0 minutes, 0 seconds and a frame number of 0. The absolute time address is thus absolute address information for managing tracks on the disc 90.

FIG. 10B is a diagram showing the structure of Q-channel data in mode 2.

The address ADR Q5 to Q8 of the Q-channel data in mode 2 is set at 0010 or 2 when expressed in the hexadecimal format to indicate that the sub Q data Q9 to Q80 is Q data of an audio CD in mode 2.

The sub Q data Q9 to Q80 in mode 2 is data of up to 13 digits N1 to N13 or 52 (=4×13) bits. The data N1 to N13 is followed by bits of all 0, which are further followed by a frame number of the absolute time AFRAME and a CRC code.

The data N1 to N13 is identification information representing the product number of the CD. The data N1 to N13 is used for the so-called bar coding.

FIG. 10C is a diagram showing the structure of Q-channel data in mode 3. CD specifications allow a piece of Q-channel data in mode 3 to be inserted into at least 100 consecutive sub-coding blocks.

The address ADR Q5 to Q8 of the Q-channel data in mode 3 is set at 0011 or 3 when expressed in the hexadecimal format to indicate that the sub Q data Q9 to Q80 is Q data of an audio CD in mode 3.

In the area of the sub Q data Q9 to Q80 in mode 3, an ISRC (International Standard Recording Code) I1 to I12 consisting of 60 bits is stored.

The ISRC is information used as a number or an identification peculiar to a track, which is a piece of music. Typically, the ISRC is an international standard code used for identifying a track recorded on the CD for managing a copyright.

The ISRC is followed by 0 bits, which are further followed by a frame number of the absolute time AFRAME and a CRC code.

Pieces of data I1 to I5 among the data I1 to I12 composing the ISRC are each 6 bits in length. The 6 bits are shown on the Binary column in a table of FIG. 11 along with characters represented by the 6 bits and octal representations thereof. The remaining pieces of data I6 to I12 are each expressed in a 4-bit BCD representation. Two 0 bits are inserted between the data I1 to I5 and the data I6 to I12.

The 12 bits I1 to I2 are a country code, which is 2 characters expressed in the representation shown in FIG. 11 to identify the name of a country.

The 18 bits I3 to I5 are an owner code, which is 2 alphabetical characters and 2 numerical characters expressed in the representation shown in FIG. 11 to identify the name of the owner in one of 24,480 ways.

The 8 bits I6 to I7 are a year of record, which is two 4-bit numbers I6 and I7 each expressed in the BCD format.

The 20 bits I8 to I12 are the track's serial number of recording, which is five 4-bit numbers I8 to I12 each expressed in the BCD format.

The ISRC comprising these pieces of information is inserted as a sub-code, which has a value varying from track to track, allowing the track to be identified.

The structure of Q-channel data of a mini disc is shown in FIG. 10D.

As shown in the figure, in the case of a mini disc, the Q-channel data includes a track number TNO, index information INDEX and a CRC code but excludes time information.

In addition, areas supposed for storing CTL control data Q1 to Q4 and an ADR address Q5 to Q8 are each filled with "0000".

5: Typical HCMS Management Operations of the Embodiment

As is obvious from the explanation given so far, in this embodiment, high-speed dubbing at a predetermined multiple-time speed can be carried out. Also as mentioned in the description of the conventional apparatus, however, it is feared that frequent operations to dub the same disc or the same track at a high speed may infringe a copyright since such high-speed dubbing operations may go beyond the domain of the normal private use.

In order to solve this problem, in a high-speed dubbing operation carried out in the dubbing apparatus implemented by this embodiment, a copyright is protected by imposing a restriction for each track, which is used as an object of recording, in accordance with the HCMS standard. That is to say, the dubbing apparatus is designed into a configuration for executing HCMS management.

What has been described before is confirmed once again as follows. In accordance with the HCMS standard, next high-speed dubbing of a track completing high-speed dubbing as a piece of music is prohibited during a period of at least 74 minutes following a point of time at which high-speed dubbing of the track was started.

A typical HCMS management operation carried out by the embodiment is explained as follows.

Figure 12:
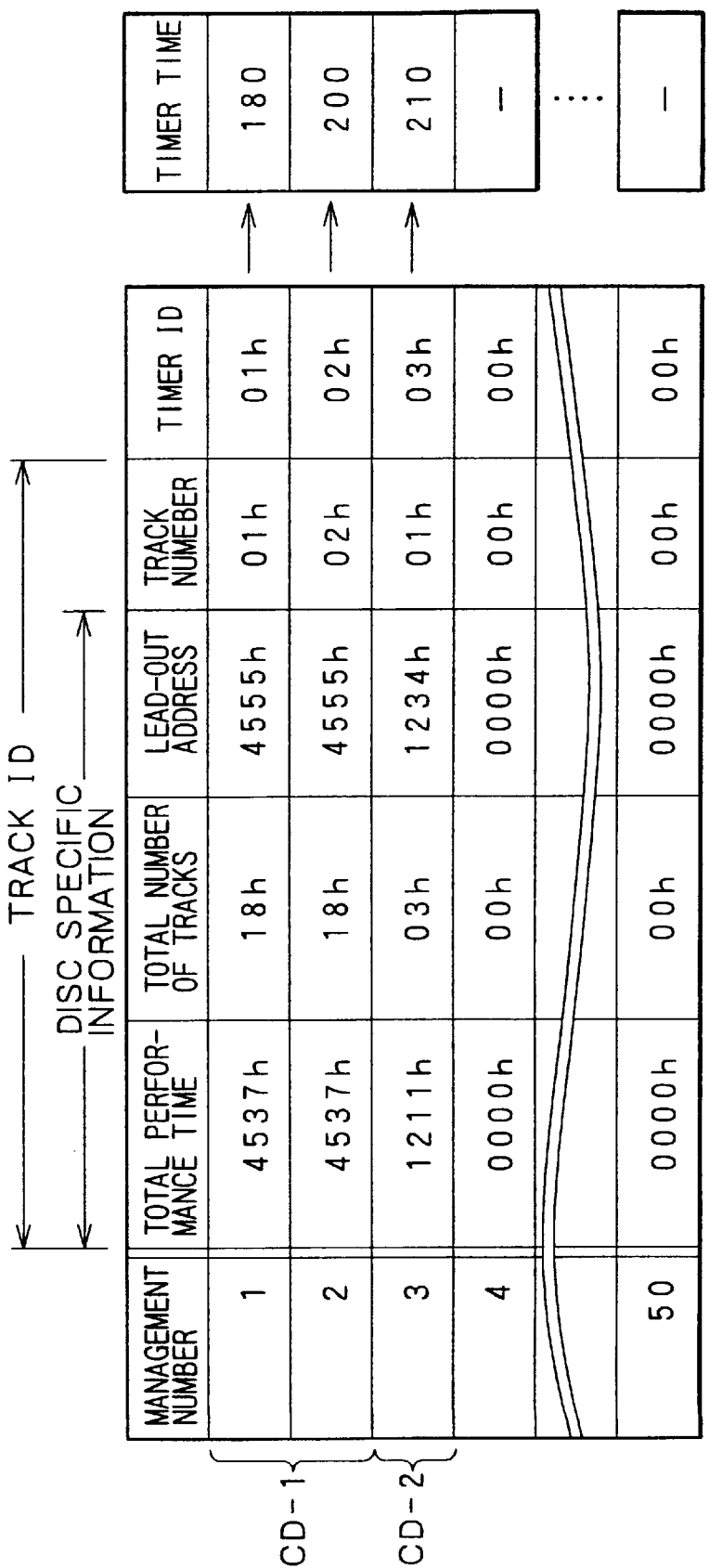
FIG. 12 is a diagram showing an HCMS table stored in a memory.

FIG. 12 is a typical data mapping structure of the HCMS-management-table memory 22.

In the HCMS-management-table memory 22 shown in FIG. 12, entry areas corresponding to management numbers 1 to 50 are provided. There are provided as many management numbers as tracks that can be subjected to the HCMS management. In this example, a maximum of 50 tracks can be subjected to the HCMS management.

Information stored in an entry area corresponding to each management number is classified into 2 main categories, namely, a track ID and a timer ID. The track ID is further divided into disc specific information and a track number. The disc specific information comprises a total performance time, the total number of tracks and a lead-out address.

The 3 pieces of information included in the disc specific information, namely, the total performance time, the total number of tracks and the lead-out address can be obtained on the basis of TOC information of a disc on which the track is recorded.

As is obvious from the description with reference to FIGS. 8A and 9, the TOC of a CD shows the start point of each track recorded on the CD and the start point of the lead-out area in terms of minutes, seconds and frames. Thus, from these start points, it is possible to obtain the 3 pieces of information included in the disc specific information, namely, the total performance time, the total number of tracks and the lead-out address. To be more specific, the total performance time is found as a sum of performance times of all tracks. The total number of tracks is found from the number of the last track for POINT having a value of A1. The lead-out address is found by referring to the start point of a lead-out track for POINT having a value of A2.

When considering the total performance time, the total number of tracks and the lead-out address as a whole, it is possible to regard them as CD specific information, that is, information peculiar to a CD. That is to say, a set of these 3 pieces of information can be treated like disc specific information. Then, by combining the CD specific information and a track number in a CD identified by the CD specific information, it is possible to obtain information used as a track ID for identifying a track.

It should be noted that, since a total performance time, a total number of tracks, a lead-out address and a track number are 2 bytes, 1 byte, 2 bytes and 1 byte in length respectively, a track ID has a total length of 6 bytes.

A timer ID is assigned to each of a plurality of timers provided in the timer unit 23. A timer-ID area shown in FIG. 12 is used for storing the timer ID of a timer provided in the timer unit 23 for the HCMS management as described below.

As many timers as controllable tracks are provided in the timer unit 23. Typically, the number of controllable tracks, that is, the maximum track number is 50. Thus, in this case, 50 timers are provided. Accordingly, the HCMS management-table memory 22 also comprises 50 entries each including a timer-ID field. In this case, a 2-byte timer-ID field is used for storing a timer ID with a value in the range 01h (or the decimal number 1) to 32h (or the decimal number 50).

Initially, no track is cataloged in the HCMS-management-table memory 22. Then, as the 2 tracks Tr1 and Tr2 are dubbed at a high speed from a CD to an MD, the tracks Tr1 and Tr2 are cataloged in the HCMS-management-table memory 22 as shown in FIG. 12. Let the CD be referred to as CD-1 in the following description for the sake of convenience.

From the TOC information read out from CD-1 and stored in the RAM 21a, assume that the total performance time, the total number of tracks and the lead-out address are found to be 45 minutes and 37 seconds, 18, and 45 minutes and 55 seconds respectively.

In this case, with a timing coinciding with the high-speed dubbing of the track Tr1 of CD-1, the system controller 21 first of all stores the total performance time of 4537h representing 45 minutes and 37 seconds, the total track number of 18h representing 18 tracks and the lead-out address of 4555h representing 45 minutes and 55 seconds in the first entry in the HCMS-management-table memory 22 indicated by the management number of 1 as shown in FIG. 12. In the track-number field, a value of 01h representing a track number of 1 is cataloged. The track number of 1 is the ID of a track, the high-speed dubbing of which is started.

As described above, the number of frames is omitted from the expressions of the total performance time and the lead-out address. It should be noted, however, that in actuality, the number of frames may be included in the numerical expression cataloged in each of the fields of the total performance time and the lead-out address.

In addition, when a track ID is newly stored in the HCMS-management-table memory 22, an unused timer employed in the timer unit 23 is selected and activated. The timer ID of the selected timer is associated with the newly cataloged track ID. Each timer employed in the timer unit 23 is a 74-minute timer. Once activated, the timer operates to count down for a period of 74 minutes starting from the activation time. It should be noted that each timer can be set to reversely count up from 0 to 74 minutes.

In this case, the timer ID of the selected timer is cataloged in the timer-ID field of the same entry of the HCMS-management-table memory 22 as the total performance time, the total number of tracks, the lead-out address and the track ID.

That is to say, a timer ID of 01h is cataloged for the activated timer, being associated with the start of the high-speed dubbing of the track Tr1 from CD-1. As a result, in the timer-ID field of the entry indicated by the management number of 1, a value of 01h is cataloged as shown in FIG. 12.

Then, when the high-speed dubbing of the track Tr1 from CD-1 is completed, high-speed dubbing of the track Tr2 from CD-1 is started.

In this case, in the timer-ID field of the entry indicated by the management number of 2, a value of 02h is cataloged for the track Tr2 of CD-1 as shown in FIG. 12. That is to say, the ID of the track Tr2 of CD-1 is cataloged in the timer-ID field of the entry indicated by the management number of 2 and, at the same time, a timer with an ID of typically 02h in the timer unit 23 is activated whereas the timer ID of 02h is cataloged in the timer-ID field of the same entry.

In the example shown in FIG. 12, a track Tr1 of CD-2 different from CD-1 is subjected to high-speed dubbing.

In this case, the track Tr1 of CD-2 is cataloged in an entry indicated by a management number of 3 in the HCMS-management-table memory 22 shown in FIG. 12. To put it in detail, what is cataloged in the entry is the track ID and a timer ID of 03h assigned to the timer activated at the start of the high-speed dubbing of the track Tr1 recorded on CD-2. The track ID comprises the disc specific information of CD-2 and a track number of 01h. In this case, the disc specific information comprises a total performance time of 1211h, a total track number of 03h and a lead-out address of 1234h.

In the case described above, the 3 tracks subjected to the high-speed dubbing are cataloged in the HCMS-management-table memory 22. The timers with timer IDs of 01h, 02h and 03h activated for the 3 cataloged tracks actually count down in the timer unit 23 since the starts of the high-speed-dubbing operations of their respective tracks. At a point of time, the timers with timer IDs of 01h, 02h and 03h have timer times of 180, 200 and 210 respectively as shown in FIG. 12.

When the system controller 21 needs to refer to the HCMS-management-table memory 22 for a timer time of a timer activated for a track cataloged in the HCMS-management-table memory 22, the system controller 21 specifies the ID of the desired track and the ID of the timer in an access to the HCMS-management-table memory 22 to read out the timer time. To put it concretely, in order to obtain the timer time of the track Tr1 recorded on CD-1, the system controller makes an access to an entry indicated by the ID of the track Tr1 and the ID of the timer assigned to the track Tr1, that is, an entry indicated by the management number of 1, for the timer time.

A time measured by each timer employed in the timer unit 23 has a maximum value of 74 minutes. The timer time of each timer shown in FIG. 12 is a number representing the remaining time in the period of 74 minutes. Thus, the initial value of a timer time represents the period of 74 minutes at a predetermined resolution. For a resolution of 20 seconds, for example, the timer counts down at intervals of 20 seconds, that is, the timer decrements the timer time for every 20 seconds, and the initial timer time is set at the following value:

$$74 \times 60/20 = 222 < 255$$

Since the initial value is smaller than 255, the timer can be implemented sufficiently by a variable with a size of 1 byte.

When a period of time equal to 74 minutes lapses, that is, when the timer time of a timer corresponding to a track ID stored in the HCMS-management-table memory 22 becomes 0, all pieces of information in an entry corresponding to the track ID and the timer ID of the timer are erased from the HCMS-management-table memory 22.

In the example with entries indicated by management numbers of 1 to 50 as shown in FIG. 12, entries indicated by a management number of 4 and subsequent numbers have not been used. In an unused entry, all 0s are stored. To be more specific, 0000h, 00h, 0000h and 00h are stored in the fields of the total performance time, the total number of tracks, the lead-out address and the track number respectively. The timer-ID field is also set at 00h to indicate that no timer is used for this entry.

In this embodiment, the HCMS-management-table memory 22 is configured in the way described above. It should be noted that the numerical expressions stored in the fields of each entry are no more than typical representations. That is to say, the scope of the present invention is not limited to the typical expressions adopted by the embodiment.

Assume for example that, at the present time, tracks are cataloged in the HCMS-management-table memory 22 as shown in FIG. 12 and timers associated with the cataloged tracks are measuring times. Under such a circumstance, HCMS management is executed to restrict high-speed dubbing of the cataloged tracks as follows.

In the first place, the 3 tracks cataloged in the HCMS-management-table memory 22, namely, the tracks Tr1 and Tr2 of CD-1 and the track Tr1 of CD-2, are under the HCMS management to prohibit high-speed dubbing of the tracks as shown in FIG. 12. To put it concretely, the dubbing apparatus is designed into a configuration with specifications at least inhibiting a dubbing & recording operation of a track completing high-speed dubbing such as the track Tr1 or Tr2 of CD-1 or the track Tr1 of CD-2 in an attempt made by the user to again carry out high-speed dubbing. That is to say, the specifications prohibit high-speed dubbing of a track having an ID matching a track ID cataloged in the HCMS-management-table memory 22.

In the second place, the configuration of the dubbing apparatus must allow high-speed dubbing of a track that is exempted from the prohibition of high-speed dubbing. A track exempted from the prohibition of high-speed dubbing is a track not cataloged in the HCMS-management-table memory 22. Examples of such a track are, first of all, tracks recorded on a CD other than CD-1 and CD-2, tracks recorded on CD-1 other than the tracks Tr1 and Tr2 and tracks recorded on CD-2 other than the track Tr1.

As described above, when the counting-down period of a timer corresponding to a track ID stored in the HCMS-management-table memory 22 is ended, all pieces of information in an entry corresponding to the track ID and the timer ID of the timer are erased from the HCMS-management-table memory 22 so that high-speed dubbing of a track indicated by the track ID is thereafter permitted.

In the example shown in FIG. 12, the timer time first has a value of 180 corresponding to about 50 minutes. Thus, when a period of about 50 minutes lapses from the present point of time, all pieces of information in an entry, indicated by the management number 1, for the track Tr1 recorded on CD-1 are erased from the HCMS-management-table memory 22 so that high-speed dubbing of the track Tr1 on the CD-1 is thereafter permitted.

In this way, in this embodiment, high-speed redubbing of a track once dubbed at a high speed is prohibited during a period of typically 74 minutes following the start of an operation to dub the track at a high speed so that an attempt to again dub the track at a high speed made within the period will end in a failure. It is thus possible to prevent a copyright from being infringed by a number of copy operations carried out on the same track within a short period of time.

As described above, TOC information recorded on a CD is combined with a track number to form a track ID. It should be noted, however, that a track ID can also be formed from an ISRC explained earlier by referring to FIG. 10C. In this case, since an ISRC is information inserted into digital audio data of each track, however, a judgment as to whether high-speed dubbing of a track recorded on a CD is allowed or prohibited must be formed after the track is played back from the CD and Q-channel data of mode 3 is extracted.

In the case of this embodiment, on the other hand, since a track ID shown in FIG. 12 is formed from TOC information, a judgment as to whether high-speed dubbing of a track recorded on a CD is allowed or prohibited can be formed before the track is played back from the CD.

For a comparison purpose, assume that execution of the HCMS management is based on the ISRC described above. In this case, a time it takes for the system controller 21 to detect an ISRC included in Q-channel data in mode 3 after an operation to play back a track from a CD at a 1-time speed is started is about 1 second, which corresponds to 75 sub-coding blocks on the assumption that at least 1 ISRC is always included in 100 sub-coding blocks. Even though such a time depends on the actual playback speed, an ISRC can be detected within 1 second with an all but high degree of reliability. In addition, in execution of HCMS management based on an ISRC, the ISRC itself is used as a track ID. Thus, unlike the track ID shown in FIG. 12, processing to create a track ID from TOC information of the CD can be eliminated. As a result, HCMS management based on an ISRC can be considered to be a sufficiently practical and useful technique.

As a simpler HCMS-management technique, it is possible to implement total management whereby a recording medium such as a CD serving as a copy source is taken as a unit. To put it concretely, in this case, management is executed by associating the disc specific information explained earlier by referring to FIG. 12 with a timer ID.

That is to say, typically only a disc ID, that is, disc specific information, is stored in the track-ID field shown in FIG. 12 for each execution of high-speed dubbing. Besides the disc ID, a timer ID is stored. A timer indicated by the timer ID in the timer unit 23 is activated when high-speed dubbing of the disc is started.

Then, when an attempt is made to dub a CD at a high speed, the disc ID of the CD is compared with disc IDs cataloged in the HCMS-management-table memory 22. If the disc ID of the CD matches any one of the disc IDs cataloged in the HCMS-management-table memory 22, the high-speed dubbing of the disc is prohibited. If the disc ID of the CD does not match any one of the disc IDs cataloged in the HCMS-management-table memory 22, on the other hand, the high-speed dubbing of the disc is permitted.

In the case of this simple HCMS management, however, the management is executed in disc units. Thus, when the track Tr1 recorded on the CD is dubbed at a high speed, for example, high-speed dubbing of not only the track Tr1 but also the remaining track Tr2 and subsequent tracks recorded on the CD is prohibited during a period of 74 minutes beginning from the start of the high-speed dubbing of the track Tr1.

It should be noted that the initial timer time or the high-speed dubbing prohibition period adopted by this embodiment to protect a copyright is not limited to 74 minutes if it is not necessary to follow HCMS regulations in particular. The high-speed dubbing prohibition period can be set at a value smaller or greater than 74 minutes in accordance with a result of consideration of factors such as an actual usage condition and an effect of the copyright protection.

Let an average of performance times of tracks be about 3 minutes. In this case, the initial timer time can conceivably be set at 3 minutes, which are equal to the performance time of 1 track. In addition, the start of the time measurement of a timer does not have to coincide with the beginning of high-speed dubbing of a track associated with the timer. Instead, the time measurement of a timer can be started at a time during high-speed dubbing of a track associated with the timer. For example, the time measurement of a timer can be conceivably started at the end of high-speed dubbing of a track associated with the timer.

6: Dubbing Operations of the Embodiments 6-1: First Implementation

By using the explanation given so far as a basis, the following description explains an example of the dubbing operation carried out by the embodiment. The dubbing operation is performed under a condition of execution of the HCMS management by adoption of the technique explained earlier by referring to FIG. 12.

Figure 13:
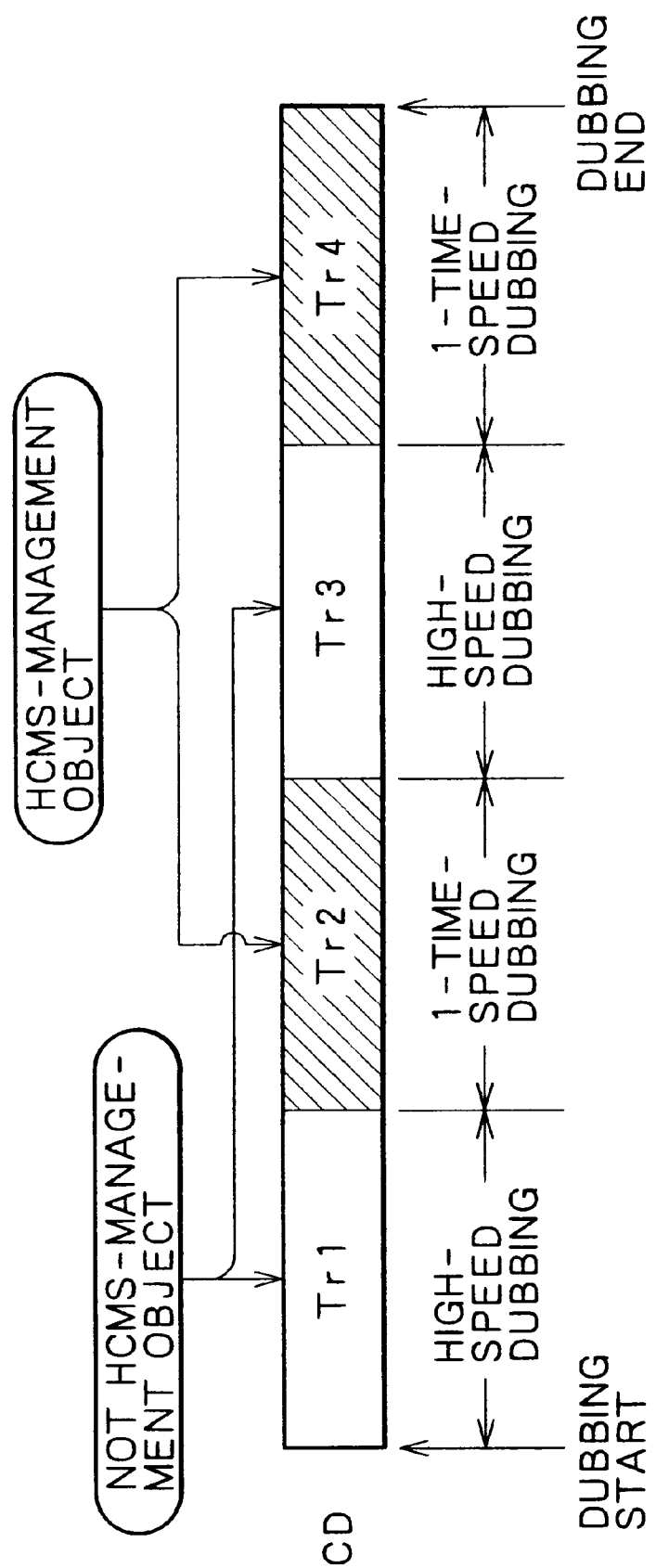
FIG. 13 is a model diagram showing a playback-only medium CD in which tracks under HCMS management coexist with tracks exempted from the HCMS management.

FIG. 13 is a diagram showing a first implementation exemplifying a typical dubbing operation in a simple and plain manner.

As shown in the figure, 4 tracks Tr1 to Tr4 have been recorded on a CD. As the present state of the HCMS management, the tracks Tr1 and Tr3 are exempted from the HCMS management while the tracks Tr2 and Tr4 are each an object of the HCMS management. That is to say, the tracks Tr2 and Tr4 were once subjected to high-speed dubbing during the past 74 minutes with the present point of time taken as a reference and, therefore, cataloged in the HCMS-management-table memory 22 so as to prohibit high-speed dubbing thereof. On the other hand, the tracks Tr1 and Tr3 are not cataloged in the HCMS-management-table memory 22 so that their high-speed dubbing is allowed.

In such a state of the HCMS management, assume that the user mounts the CD shown in FIG. 13 on the dubbing apparatus implemented by this embodiment. Then, the user carries out an operation to set a high-speed dubbing mode for implementing dubbing at a high speed and an operation to dub all the tracks from the CD to the MD.

In this case, the CD unit plays back the tracks from the CD in an order of increasing track numbers whereas the MD unit records the tracks onto the MD in a dubbing recording operation. Thus, the dubbing operation begins with the track Tr1.

Since the first dubbed track Tr1 recorded on the CD is exempted from the HCMS management, high-speed dubbing of the track Tr1 is permitted. Thus, in the dubbing apparatus implemented by this embodiment, the track Tr1 is subjected to high-speed dubbing, being recorded onto the MD. At the beginning of the high-speed dubbing of the track Tr1, processing is also carried out to catalog the track Tr1 into the HCMS-management-table memory 22. Since the track Tr1 is cataloged in the HCMS-management-table memory 22, management is executed to prohibit high-speed re-dubbing of the track Tr1 till a period of 74 minutes lapses since the start of the high-speed dubbing of the track Tr1.

As the high-speed dubbing of the track Tr1 is completed, an attempt is made to start high-speed dubbing of the track Tr2. Since the track Tr2 has already been cataloged in the HCMS-management-table memory 22, however, management is executed to prohibit high-speed re-dubbing of the track Tr2.

In this case, this embodiment switches the dubbing speed to the 1-time speed for the track Tr2, the high-speed dubbing of which is prohibited, and copies the track Tr2 from the CD to the MD in a dubbing operation at the 1-time speed.

Then, the completion of the 1-time-speed dubbing operation of the track Tr2 is taken as a timing to start high-speed dubbing of the track Tr3. Since the track Tr3 recorded on the CD is exempted from the HCMS management, high-speed dubbing of the track Tr3 is permitted. Thus, in the dubbing apparatus implemented by this embodiment, the dubbing speed is switched back to the predetermined multiple-time speed and the track Tr3 is subjected to high-speed dubbing, being recorded onto the MD.

As the high-speed dubbing of the track Tr3 is completed, an attempt is made to start high-speed dubbing of the track Tr4. Since the track Tr4 has already been cataloged in the HCMS-management-table memory 22, however, management is executed to prohibit high-speed re-dubbing of the track Tr4. In this case, much like the track Tr2, this embodiment switches the dubbing speed to the 1-time speed for the track Tr4, the high-speed dubbing of which is prohibited, and copies the track Tr4 from the CD to the MD in a dubbing operation at the 1-time speed.

In the conventional apparatus, when an attempt is made to start high-speed dubbing of a track, the high-speed dubbing of which is prohibited, during a recording operation carried out in a high-speed dubbing mode, the dubbing operation itself is discontinued.

In the case of this embodiment, on the other hand, a track, the high-speed dubbing of which is permitted is subjected to high-speed dubbing while, for another track, the high-speed dubbing of which is prohibited, the dubbing speed is switched to the 1-time speed for carrying out a dubbing operation for the other track as described above.

In the high-speed-dubbing mode, for a track, the high-speed dubbing of which is prohibited, the dubbing speed is switched to the 1-time speed, that is, a low speed for carrying out a dubbing operation not violating HCMS regulations for the track. In this way, the recording operation carried out in the high-speed-dubbing mode can be continued till the last track without suspending the dubbing/recording operation in the course of processing.

Figure 14:
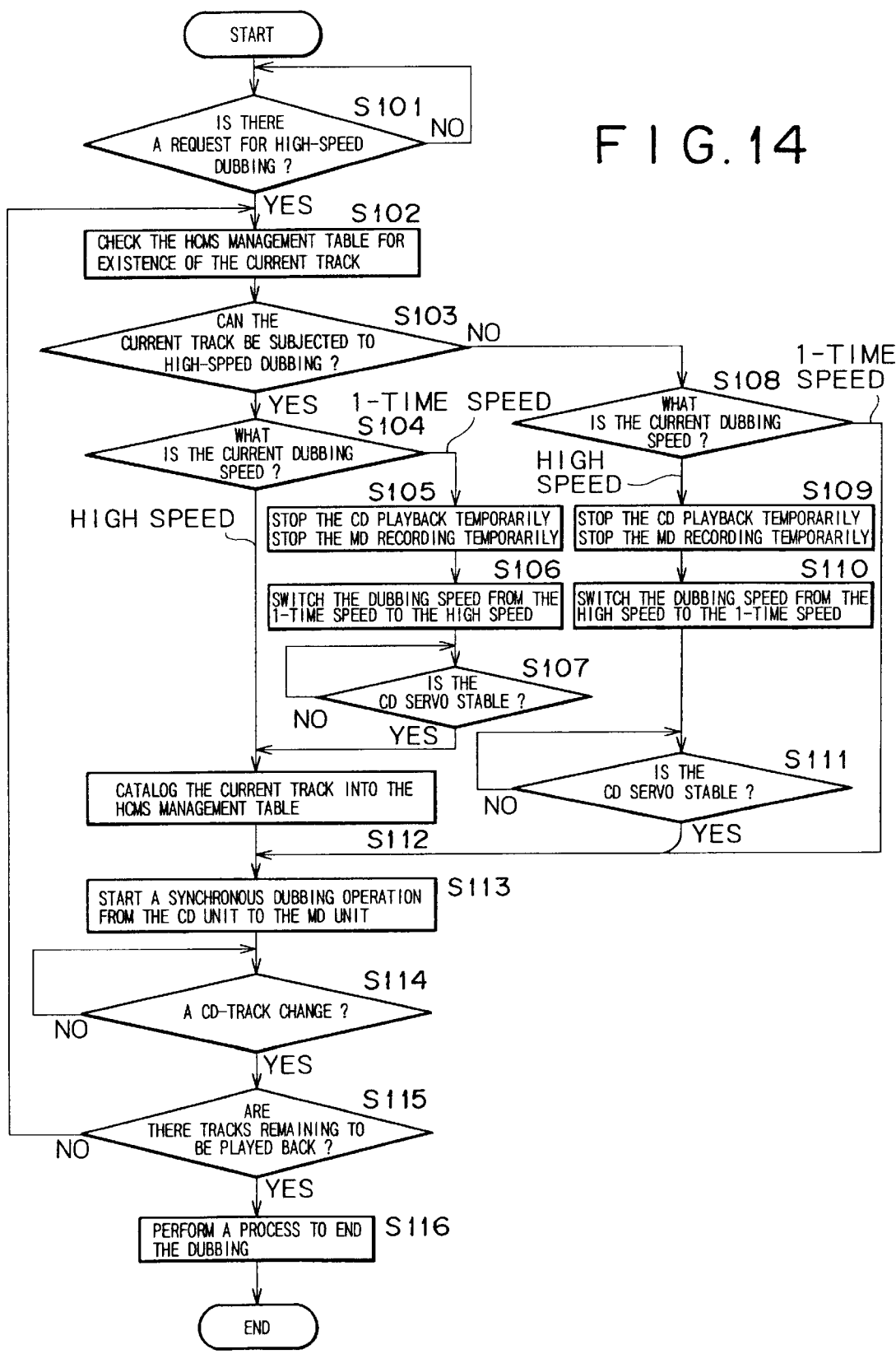
FIG. 14 shows a flowchart representing operations carried out by a first embodiment of the present invention.

FIG. 14 shows a flowchart representing operations carried out by a first embodiment of the present invention, that is, the dubbing operations given as the first implementation shown in FIG. 13. It should be noted that the system controller 21 carries out the operations represented by the flowchart.

As shown in the figure, the processing begins with a step S101 at which the system controller 21 enters a state of waiting for a request for high-speed dubbing to be made. As the user makes a request for high-speed dubbing by typically carrying out an operation to start high-speed dubbing, the flow of the processing goes on to a step S102.

At the step S102, the HCMS-management-table memory 22 is referenced for information on a current track to be dubbed. A current track is one of tracks recorded on the CD selected as a track to be dubbed at the present time. When the operation of the step S102 is carried out for the first time, the first track in the playback order of the CD shown in FIG. 13 is taken as the current track.

The flow of the processing then goes on to a step S103 to form a judgment as to whether high-speed dubbing of the current track is prohibited or permitted, that is, whether or not the information on the current track is found as a result of referencing the HCMS-management-table memory 22 at the step S102. A result of referencing the HCMS-management-table memory 22 indicating that the information on the current track is not cataloged in the HCMS-management-table memory 22 can be interpreted as permitted high-speed dubbing of the current track. In this case, the flow of the processing goes on to a step S104. On the other hand, a result of referencing the HCMS-management-table memory 22 indicating that the information on the current track is cataloged in the HCMS-management-table memory 22 can be interpreted as prohibited high-speed dubbing of the current track. In this case, the flow of the processing goes on to a step S108.

As described above, if high-speed dubbing of the current track is permitted, the flow of the processing then goes on to the step S104 to form a judgment as to whether the current dubbing speed is a 1-time speed or a high speed. If the result of the judgment indicates that the current dubbing speed is a high speed, the flow of the processing goes on to a step S112 directly. If the result of the judgment indicates that the current dubbing speed is a 1-time speed, on the other hand, the flow of the processing goes on to the step S112 by way of steps S105, S106 and S107.

At the step S105, control is executed to temporarily halt the playback operation of the CD and the recording operation of the MD. The playback operation of the CD is temporarily halted after completion of the playback operation of the immediately preceding track but prior to the start of the playback operation of the current track. By the same token, the recording operation of the MD is temporarily halted with a timing of completion of an operation to write data of the immediately preceding track into an area to the last location for the data on the MD. Processing carried out at a step S109 to be described later is the same as the processing of the step S105.

At the step S106, control is executed to switch the dubbing speed from the 1-time speed to the high speed. That is to say, the rotational speed of the CD in the CD unit is controlled to an N-time CLV and the frequency of a clock signal supplied to a variety of components employed in the CD unit is also set at a value equal to N times the normal clock frequency as described earlier by referring to FIG. 2.

The flow of the processing then goes on to a step S107 to enter a state of waiting for a condition to be stabilized after a variety of servo control operations in the CD unit are carried out at the N-time speed. Then, the flow of the processing goes on to the step S112. It should be noted that the system controller 21 is capable of forming a judgment as to whether or not the variety of servo control operations in the CD unit have been stabilized at the step S107 by monitoring the operating condition of the PLL circuit 39 to determine whether the PLL circuit 39 has entered a locked state at the N-time speed. Typically, in an actual implementation of this embodiment, a predetermined signal is generated when the PLL circuit 39 enters a locked state at the N-time speed. In this case, the system controller 21 is capable of forming a judgment as to whether or not the variety of servo control operations in the CD unit have been stabilized at the step S107 by detecting the signal generated for the locked state.

At the step S112, processing is carried out to catalog the current track into the HCMS-management-table memory 22. To put it in detail, a track ID is formed from TOC information of the CD presently mounted on the CD unit and the number of the current track as described earlier by referring to FIG. 12. The track ID and a timer ID are then cataloged in an entry indicated by an available management number in the HCMS-management-table memory 22. Then, a timer indicated by the cataloged timer ID is activated.

After the processing to catalog the current track into the HCMS-management-table memory 22 is completed, the flow of the processing goes on to a step S113 at which control of the operations of the CD and MD units is started so as to correctly carry out the subsequent processing to dub the current track. When the flow of the processing arrives at the step S113 through the steps S104 and S112 or through the steps S104, S105, S106, S107 and S112, control is executed to synchronously carry out a recording operation of the MD unit and a playback operation of the CD unit as high-speed dubbing. When the flow of the processing arrives at the step S113 through the step S108 or through the steps S108, S109, S110, S111 and S112, on the other hand, control is executed to synchronously carry out a recording operation of the MD unit and a playback operation of the CD unit as 1-time-speed dubbing.

If the result of the judgment formed at the step S103 indicates that high-speed dubbing of the current track is prohibited, on the other hand, the flow of the processing goes on to the step S108 to form a judgment as to whether the current dubbing speed is a 1-time speed or a high speed. If the result of the judgment indicates that the current dubbing speed is the 1-time speed, the flow of the processing goes on directly to the step S113 to start a recording operation of the MD unit and a playback operation of the CD unit as 1-time-speed dubbing.

If the result of the judgment formed at the step S108 indicates that the current dubbing speed is high speed, on the other hand, the flow of the processing goes on to the step S113 by way of steps S109, S110 and S111. At the step S109, control is executed to temporarily halt the playback operation of the CD and the recording operation of the MD. At the step S110, control is executed to switch the dubbing speed from the high speed to the 1-time speed. The flow of the processing then goes on to a step S111 to enter a state of waiting for a condition to be stabilized after a variety of servo control operations in the CD unit are carried out at 1-time speed. Then, the flow of the processing goes on to the step S113 to start a dubbing operation of the current track at the 1-time speed.

The flow of the processing continues from the step S113 to a step S114 to enter a state of waiting for a track change in the CD currently undergoing a playback operation. As a track change is detected, the flow of the processing proceeds to a step S115.

At the step S115, the system controller 21 forms a judgment as to whether or not a track remaining to be played back exists as an undubbed object in the CD, which serves as a source of dubbing recording medium. Normally, tracks are played back from the CD in an order of increasing track numbers. In this case, the judgment of the step S115 is formed typically by determining whether or not a track change detected at the step S114 has occurred after the operation to play back a track with the last track number.

If the outcome of the judgment formed at the step S115 indicates that a track remaining to be played back exists as an undubbed object in the CD, the flow of the processing goes back to the step S102 at which the HCMS-management-table memory 22 is referenced for information on a new current track to be dubbed. When the flow of the processing goes back from the step S115 to the step S102, a track to be played back next from the CD and recorded into the MD in the next dubbing operation as indicated by the track change detected at the step S114 is taken as the new current track.

By repeatedly carrying out the operations of the steps S102 to S115 described above, a dubbing operation can be carried out continuously to perform high-speed dubbing on tracks with the high-speed dubbing thereof permitted like the ones shown in FIG. 13 and perform 1-time-speed dubbing on tracks, the high speed dubbing of which is prohibited like those shown in the same figure.

If the outcome of the judgment formed at the step S115 indicates that a track remaining to be played back no longer exists as an undubbed object in the CD, on the other hand, the flow of the processing goes on to a step S116 at which the playback operation of the CD and the recording operation of the MD are halted. In addition, necessary end processing such as processing to update the U-TOC recorded on the MD is carried out in accordance with results of processing obtained so far if required.

6-2: Second Implementation

A second implementation of the embodiment is used for exemplifying the dubbing operation. Also in the dubbing operation exemplified by the second implementation, the HCMS management is executed as shown in FIG. 12 to implement dubbing and recording in the high-speed-dubbing mode.

A second implementation is used to exemplify the dubbing operation by referring to FIGS. 15A to 21.

Figures 15A, 15B:
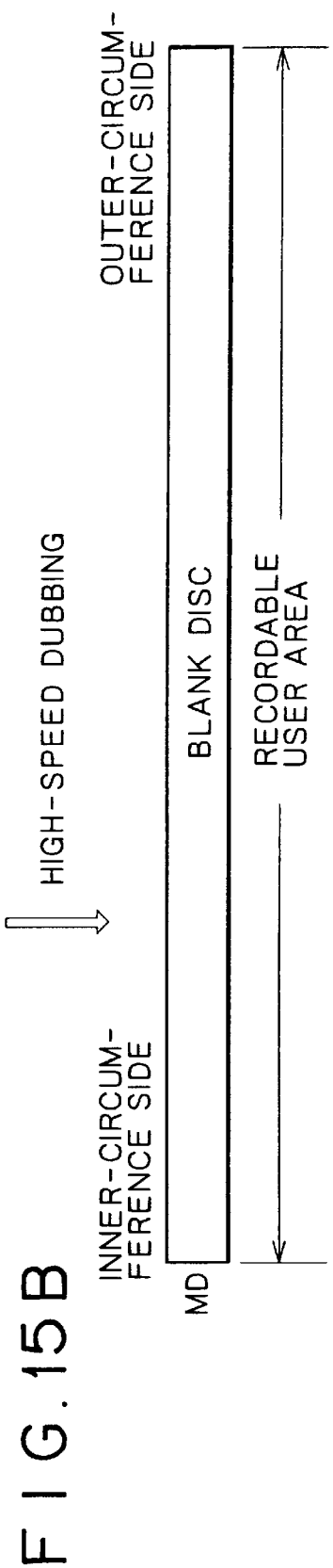
FIG. 15A is a model diagram showing tracks recorded on a playback-only medium CD, which serves as a playback source.
FIG. 15B is a model diagram showing a recording area on a writable recording medium MD, which serves as a recording target.

The recording medium serving as a source of dubbing in this example is a CD-A for recording 10 tracks Tr1 to Tr10 as shown in FIG. 15A. On the other hand, a recording medium MD serving as a destination of dubbing is the so-called blank disc with no audio data recorded in its recordable user area at all as shown in FIG. 15B. It should be noted that, as is generally known, data is recorded on circular tracks created on a signal surface of an MD starting with the innermost circumferential track in a direction toward the outermost circumferential track.

In this second implementation, all data recorded on the CD-A shown in FIG. 15A is subjected to a dubbing & recording process in a high-speed-dubbing mode to the MD shown in FIG. 15B.

FIGS. 16A to 16E are each a diagram showing data cataloged in the HCMS-management-table memory 22 and a stage in the course of the dubbing operation exemplified by the second implementation. The figures show a procedure of the dubbing operation in terms of steps ① to ⑦.

To be more specific, FIG. 16A shows data cataloged in the HCMS-management-table memory 22 immediately before the operation to dub all data recorded in the CD-A shown in FIG. 15A to the MD shown in FIG. 15B. As shown in FIG. 16A, the track IDs of the track Tr2 and Tr4 recorded on the CD-A are cataloged respectively in entries indicated by management numbers of 1 and 2 in the HCMS-management-table memory 22.

Both the track IDs include common information, namely, a CD-A total performance time of 40 minutes and 23 seconds, a total track number of 10 and a lead-out address of 41 minutes and 00 seconds as indicated by a value of 4023h stored in the field of the total performance time, a value of 10h in the field of the total track number and a value of 4100h in the field of the lead-out address in both the entries indicated by the management numbers of 1 and 2 in the HCMS-management-table memory 22. The entry indicated by the management number of 1 includes a track number of 02h in the field of the track number and a timer ID of 01h in the field of the timer ID for the track Tr2. On the other hand, the entry indicated by the management number of 2 includes a track number of 04h in the field of the track number and a timer ID of 02h in the field of the timer ID for the track Tr4.

At this point of time, the timer time of a timer indicated by the timer ID of 01h in the entry indicated by the management number of 1 is 30. On the other hand, the timer time of a timer indicated by the timer ID of 02h in the entry indicated by the management number of 2 is 200. In this state of management, the 2 tracks Tr2 and Tr4 among the 10 tracks recorded on the CD-A are presently under the HCMS management to prohibit high-speed dubbing thereof.

Assume for example that the user mounts the CD-A and the MD shown in FIGS. 15A and 15B respectively on the dubbing apparatus implemented by this embodiment, and then carries out a predetermined operation on the operation unit 19 to start high-speed dubbing under a condition represented by the state of management shown in FIG. 16A.

When the requested high-speed dubbing is started, basically, the CD unit plays back the tracks Tr1 to Tr10 from the CD-A in an order of increasing track numbers, and transfers the reproduced tracks to the MD unit. The MD unit then writes audio data of the tracks Tr1 to Tr10 played back from the CD-A onto the MD.

As is obvious from the entries of the HCMS-management-table memory 22 shown FIG. 16A, the track Tr1 played back initially from the CD-A is not cataloged in the HCMS-management-table memory 22. Thus, the track Tr1 can be dubbed at a high speed. Thus, first of all, at a step ① of the procedure, the track Tr1 is dubbed at a high speed. With a timing to start the high-speed dubbing of the track Tr1, the track Tr1 is cataloged in typically an entry indicated by a management number of 3 in the HCMS-management-table memory 22. It should be noted, however, that the operation to catalog the track Tr1 with such a timing is not shown explicitly in FIG. 16A. To be more specific, the track ID identifying the track Tr1 and the timer ID of a timer activated at that time are cataloged in the entry indicated by a management number of 3 in the HCMS-management-table memory 22. This data-cataloging operation is also carried out for a track subjected before to high-speed dubbing as explained in the following description.

As a period of time about equal to the playback time of the track Tr1 lapses since the start of the high-speed dubbing of the track Tr1 carried out at the step ① of the procedure, the HCMS management state shown in FIG. 16A changes to an HCMS management state shown in FIG. 16B at the end of the high-speed dubbing of the track Tr1.

As shown in FIG. 16B, the timer times for the timer IDs of 01h and 02h are decremented by a difference corresponding to the duration of the high-speed dubbing of the track Tr1 to values smaller than those shown in FIG. 16A due to countdown operations taking place in the respective timers during the high-speed dubbing of the track Tr1. In the management state shown in FIG. 16B, however, high-speed dubbing of the tracks Tr2 and Tr4 on the CD-A remains prohibited as is the case with the management state shown in FIG. 16A.

After the high-speed dubbing of the track Tr1 carried out at the step ① of the procedure is completed, the CD unit normally carries out an operation to play back the track Tr2. At that time, however, high-speed dubbing of the track Tr2 remains prohibited as indicated by the HCMS management state shown in FIG. 16B.

In such a case, the dubbing operation of the track Tr2 itself is not carried out at this stage of this second implementation but will be performed later. Instead, next tracks in the playback order are sequentially dubbed at a high speed. The next tracks are each a track exempted from the HCMS management at the present time, that is, a track, the high-speed dubbing of which is permitted.

That is to say, the embodiment defers the dubbing of a track treated as an object of the HCMS management at the present time, that is, a track, the high-speed dubbing of which is prohibited. Instead, tracks, the high-speed dubbing of which is permitted at the present time, are dubbed from the CD-A at a high speed sequentially in accordance with the playback order and recorded onto the MD.

In this case, the track Tr3 following the track Tr2 is the first track in the playback order, the high-speed dubbing of which is permitted. Thus, after the high-speed dubbing of the track Tr1 is completed, the track Tr3 is dubbed at a high-speed at a step ② of the procedure. That is to say, after the multiple-time-speed dubbing of the track Tr1 is completed, a track change to the track Tr3 takes place in the CD unit. The track Tr3 is then dubbed at the multiple-time speed in the same way as the track Tr1. Then, data obtained as a result of the playback operation at the multiple-time speed is recorded onto the MD.

After the high-speed dubbing of the track Tr3 carried out at the step ② of the procedure is completed, the state of the HCMS management transits to that shown in FIG. 16C.

As shown in FIG. 16C, the timer times for the timer IDs of 01h and 02h are decremented by a difference corresponding to the duration of the high-speed dubbing of the track Tr3 to values smaller than those shown in FIG. 16B due to countdown operations taking place in the respective timers during the high-speed dubbing of the track Tr3. In the management state shown in FIG. 16C, however, the timer times for the timer IDs of 01h and 02h have not become 0 yet, indicating that high-speed dubbing of the tracks Tr2 and Tr4 on the CD-A remains prohibited as is the case with the management state shown in FIG. 16B.

Thus, after the high-speed dubbing of the track Tr3 carried out at the step ② of the procedure is completed, the dubbing operation of the track Tr4, which is the next track in the playback order, is not carried out. In accordance with the present state of the HCMS management, the 6 tracks Tr5 to Tr10 following the track Tr4 can each be subjected to high-speed dubbing. Thus, at a step ③ of the procedure, the dubbing apparatus continuously dubs the tracks Tr5 to Tr10 at a high speed.

When the high-speed dubbing of the tracks Tr5 to Tr10 carried out at the step ③ of the procedure is completed, the 2 tracks Tr2 and Tr4, which were each treated as an object of the HCMS management and could not thus be subjected to high-speed dubbing at the start of the high-speed dubbing, remain to be played back from the CD-A shown in FIG. 15A.

At a point of time the high-speed dubbing of the tracks Tr5 to Tr10 carried out at the step ③ of the procedure is completed, the state of the HCMS management transits to that shown in FIG. 16D. In the state shown in this figure, the timer time for the timer ID of 01h has become 0 due to the lapse of time corresponding to the high-speed dubbing. The timer time and the timer ID are cataloged in the entry for the track Tr2 of FIG. 15A indicated by the management number of 1 in the HCMS-management-table memory 22.

That is to say, the state of the HCMS management at the point of time the high-speed dubbing of the tracks Tr5 to Tr10 carried out at the step ③ of the procedure is completed indicates that the track Tr2 recorded on the CD-A has been exempted from the HCMS management so that high-speed dubbing of the track Tr2 is permitted thereafter.

On the other hand, at the same point of time, the timer time associated with the timer ID of 02h for the track Tr4 has not become 0. That is to say, the state of the HCMS management at that point indicates that the track Tr4 is still an object of the HCMS management so that high-speed dubbing of the track Tr4 is still prohibited.

In actuality, the data cataloged in the entry indicated by the management number of 1 is erased from the HCMS-management-table memory 22 at a point of time the timer time becomes 0 as described above. In order to make the explanation easy to understand, however, the data cataloged in the entry indicated by the management number of 1 for the track Tr2 recorded on the CD-A is left in FIG. 16D.

In such a state of HCMS management, the track Tr2, the high-speed dubbing of which is permitted, is dubbed at a high speed in high-speed dubbing at a step ④ of the procedure in this second implementation.

At a point of time the high-speed dubbing of the track Tr2 carried out at the step ④ of the procedure is completed, the only track remaining to be dubbed is the track Tr4. The state of the HCMS management at the point of time the high-speed dubbing of the track Tr2 carried out at the step ④ of the procedure is completed is shown in FIG. 16E. As shown in this figure, the entry indicated by the management number of 2 in the memory 22 for the track Tr4 includes a timer time of 110 associated with a timer ID of 02h. This state of the HCMS management indicates that the high-speed dubbing of the track Tr4 is still prohibited.

In such a case, the remaining track Tr4 is subjected to dubbing and recording at the 1-time speed at a step ⑤ of the procedure. When the dubbing and recording of the track Tr4 at the 1-time speed are completed, processing to end the dubbing & recording process is carried out at a step ⑥ of the procedure. To put it in detail, after the CD unit completes the playback operation of the CD-A, the MD unit finishes the operation to record audio data onto the MD at a point of time the data of the track Tr4 is written completely onto the MD.

Figures 17A, 17B, 17C:
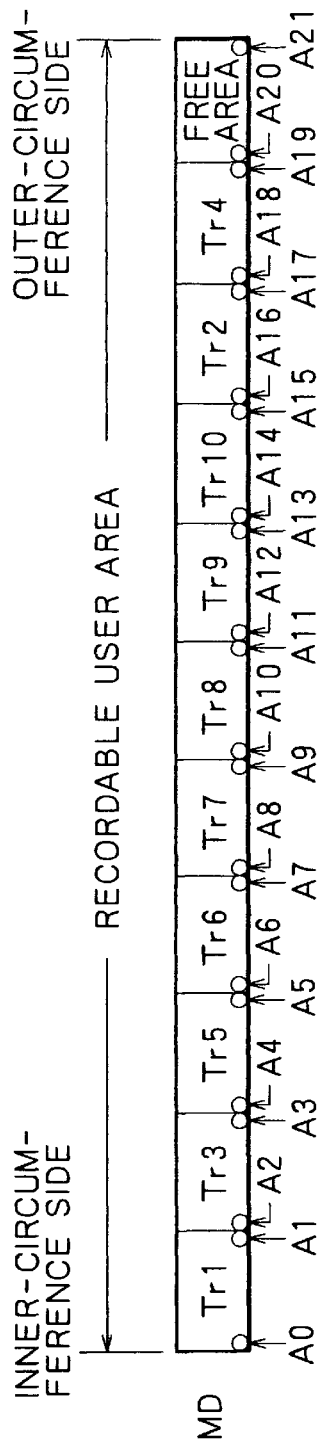
FIG. 17A is a model diagram showing tracks dubbed onto a writable recording medium MD.
FIG. 17B is a model diagram showing an order of tracks dubbed onto the writable recording medium MD prior to a track rearrangement process.
FIG. 17C is a model diagram showing an order of tracks dubbed onto the writable recording medium MD after the track rearrangement process.

FIGS. 17A and 17B are diagrams showing results of data recording carried out by the MD unit at the steps ① to ⑥ of the procedure shown in FIG. 16.

To be more specific, FIG. 17A is a diagram showing a recordable user area on the MD, which was in a blank state as shown in FIG. 15B but now contains data recorded in track units. The track numbers Tr1 to Tr10 shown in FIGS. 17A to 17C are the same as those of the CD-A shown in FIG. 15A.

As shown in FIG. 17A, in the dubbing process carried out at the steps ① to ⑥ of the procedure described earlier, the MD unit writes audio data of the tracks into the recordable user area from the start of the area on an inner circumference in a direction toward an outer circumference track after track in the following order: Tr1→Tr3→Tr5→Tr6→Tr7→Tr8→Tr9→Tr10→Tr2→Tr4. In this figure, an area between the end of the recording area of the track Tr4 and a location immediately preceding the lead-out start address is a free area.

This figure also shows the start and end addresses of each area for recording a track, which are stored in U-TOC sector 0 as described in a later explanation of a management state of U-TOC sector 0. The start and end addresses are explained as follows. It should be noted that notations A0 to A21 each denote an address, which actually has a real value.
[Track number (area): Start address, End address]
[Tr1: A0, A1]
[Tr2: A2, A3]
[Tr3: A4, A5]
[Tr4: A6, A7]
[Tr5: A8, A9]
[Tr6: A10, A11]
[Tr7: A12, A13]
[Tr8: A14, A15]
[Tr9: A16, A17]
[Tr10: A18, A19]
[Free area: A20, A21]

The MD unit basically controls tracks recorded on the MD by sequentially assigning ascending track numbers to the tracks in a chronological order in which the tracks are recorded on the MD.

The tracks Tr1 to Tr10 are dubbed from the CD-A to the MD at the steps ① to ⑥ of the procedure shown in FIG. 16 in the order of Tr1→Tr3→Tr5→Tr6→Tr7→Tr8→Tr9→Tr10→Tr2→Tr4 as shown on the lower line of FIG. 17B.

The track numbers shown on the upper line of FIG. 17B are assigned to the respective tracks recorded on the MD in the order shown on the lower line at the steps ① to ⑥ of the procedure. To put it in detail, the track numbers #1, #2, #3, #4, #5, #6, #7, #8, #9 and #10 are assigned to the tracks Tr1, Tr3, Tr5, Tr6, Tr7, Tr8, Tr9, Tr10, Tr2 and Tr4 recorded on the CD-A respectively.

In a dubbing operation like the one explained so far as the second implementation, there is possibly an unavoidable case in which tracks are recorded onto the MD in a recording order not matching the order of increasing track numbers assigned to the tracks in the CD.

If the order of recording of tracks onto the MD, that is, the order of increasing track numbers assigned to the tracks by the MD unit remains in a state of not matching the order of increasing track numbers assigned to the tracks by the CD as shown in FIG. 17B, the user will feel a sense of incompatibility with the order of increasing track numbers assigned to the tracks by the MD unit. The user naturally desires an order of increasing track numbers assigned to the tracks by the MD unit matching the order of increasing track numbers assigned to the tracks by the CD, which serves as the source of dubbing. In this case, the user must take the trouble to edit the MD by rearranging the tracks on the MD. Thus, the load borne by the user increases. It is therefore desirable to control the tracks recorded on the MD by assigning track numbers to the tracks in the same order as that set in the CD unit even if the tracks recorded on the MD are obtained as a result of a dubbing operation like the one explained as the second implementation.

For the reason described above, in the second implementation, after the dubbing & recording process carried out at the step ⑥ of the procedure is completed, processing is carried out automatically at the step ⑦ of the procedure to rearrange the tracks recorded on the MD in the same order set in the CD unit. To put it concretely, in this processing, the order of tracks recorded on the MD as shown in FIG. 17B in which the tracks would otherwise be processed is changed to an order shown in FIG. 17C. That is to say, control is executed to assign the track numbers #1 to #10 on the MD respectively to the tracks Tr1 to Tr10 dubbed from the CD-A.

The following description explains a configuration for implementing the processing carried out at the step ⑦ of the procedure.

In order to carry out the processing, first of all, it is necessary for the system controller 21 to store the order of tracks set in the CD unit when carrying out the dubbing & recording process.

Figure 18:
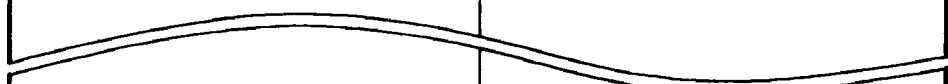
FIG. 18 shows a table showing an order of dubbing from a playback-only medium CD to a writable recording medium MD.

Thus, in carrying out a dubbing operation such as the one exemplified by the second implementation, a dubbing-order table like one shown in FIG. 18 is prepared in the RAM 21a. Each time a dubbing operation to dub a track from the CD-A is carried out during track-after-track dubbing through the steps ① to ⑥ of the procedure shown in FIG. 16, the system controller 21 records the track number of the track in the dubbing-order table at a slot for an order number of the dubbing operation. FIG. 18 is a diagram showing, in concrete terms, the contents of the dubbing-order table, which are obtained as a final result of the track-after-track dubbing through the steps ① to ⑥ of the procedure shown in FIG. 16.

The system controller 21 updates data recorded in the U-TOC as will be described later by referring to the contents of the dubbing-order table in order to rearrange the tracks into a new order.

FIG. 19 is a diagram showing typical data of a part-entry-pointer table and a management table (or part-entry table) in U-TOC sector 0 stored in the buffer memory 13 at the end of the dubbing & recording operation carried out at the step ⑥ of the procedure shown in FIG. 16 prior to a track rearrangement process. By a part entry, a table slot is implied.

Every part-entry-pointer in the part-entry-pointer table and every link information in the management table are each 1-byte data, whereas every start address and every end address in the management table are each 3-byte data. The symbol "–" in a part-entry-pointer or link information represents a part-entry-pointer or link information of 00h, while the symbol "–" in a start address or an end address represents a start address or an end address of 000000h.

Thus, the symbol "–" for the P-DFA represents a P-DFA value of 00h, which indicates that there is no defect in the recordable user area on the disc 1.

In U-TOC sector 0, the values 01h to 0Ah set at the part-entry-pointers P-TNO1 to P-TNO10 and the value 0Bh set at the part-entry-pointer P-FRA in the part-entry-pointer table, and the start addresses A0 to A20 set in the part table and the end addresses A1 to A21 set in the part table match the assignment of track numbers #1 to #10 shown in the upper row of FIG. 17B to tracks recorded on the MD and assignment of start and end addresses shown in FIG. 17A to recorded areas indicated by the track numbers #1 to #10 and a free area. On the other hand, the locations of the tracks Tr#1 to Tr#10 in the part table of U-TOC sector 0 match the their locations shown in FIG. 17A and the lower row of FIG. 17B.

As shown in FIG. 19, the part-entry pointer P-TNO1 corresponding to the track number #1 on the MD is set at 01h pointing to a part entry 01h including a start address A0 and an end address A1 of an area for recording the track Tr1, which is the first track dubbed from the CD-A.

In the same way, the part-entry pointer P-TNO2 corresponding to the track number #2 on the MD is set at 02h pointing to a part entry 02h including a start address A2 and an end address A3 of an area for recording the track Tr3, which is the second track dubbed from the CD-A.

By the same token, the part pointer P-TNOj corresponding to the track number #j on the MD is set at 0jh pointing to a part entry 0jh where j=3 to 8. The part entry 0jh includes a start address Ak and an end address Al of an area for recording the track Trm, which is the jth track dubbed from the CD-A, where k=2j–2, l=2j–1 and m=j+2.

That is to say, for j=3, the part-entry pointer P-TNO3 corresponding to the track number #3 on the MD is set at 03h pointing to a part entry 03h including a start address A4 and an end address A5 of an area for recording the track Tr5, which is the 3rd track dubbed from the CD-A. In the same way, for j=4, the part-entry pointer P-TNO4 corresponding to the track number #4 on the MD is set at 04h pointing to a part entry 04h including a start address A6 and an end address A7 of an area for recording the track Tr6, which is the 4th track dubbed from the CD-A. By the same token, for j=5, the part-entry pointer P-TNO5 corresponding to the track number #5 on the MD is set at 05h pointing to a part entry 05h including a start address A8 and an end address A9 of an area for recording the track Tr7, which is the 5th track dubbed from the CD-A.

Likewise, for j=6, the part-entry pointer P-TNO6 corresponding to the track number #6 on the MD is set at 06h pointing to a part entry 06h including a start address A10 and an end address A11 of an area for recording the track Tr8, which is the 6th track dubbed from the CD-A. Similarly, for j=7, the part-entry pointer P-TNO7 corresponding to the track number #7 on the MD is set at 07h pointing to a part entry 07h including a start address A12 and an end address A13 of an area for recording the track Tr9, which is the 7th track dubbed from the CD-A. Finally, for j=8, the part-entry pointer P-TNO8 corresponding to the track number #8 on the MD is set at 08h pointing to a part entry 08h including a start address A14 and an end address A15 of an area for recording the track Tr10, which is the 8th track dubbed from the CD-A.

In the same way, the part-entry pointer P-TNO9 corresponding to the track number #9 on the MD is set at 09h pointing to a part entry 09h including a start address A16 and an end address A17 of an area for recording the track Tr2, which is the 9th track dubbed from the CD-A.

By the same token, the part-entry pointer P-TNO10 corresponding to the track number #10 on the MD is set at 0Ah pointing to a part entry 0Ah including a start address A18 and an end address A19 of an area for recording the track Tr4, which is the 10th track dubbed from the CD-A.

Likewise, the part-entry pointer P-FRA is set at 0Bh pointing to a part entry 0Bh including a start address A20 and an end address A21 of a free area available for recording other tracks dubbed from the CD-A.

It should be noted that, in the example shown in FIG. 19, the part entries 01h to 0Bh each include no link information.

Similarly, the part-entry pointer P-EMPTY is set at 0Ch pointing to a first unused part entry 0Ch in the management table. All subsequent part entries including the last part entry FFh are unused. Unused part entries are linked by using pieces of link information.

With the information stored in the U-TOC shown in FIG. 19, the recorded tracks are controlled by a track-number order from track number #1 to track number #10 which are set on the MD and do not match the track order from track Tr1 to track Tr10 set on the CD as shown in 17B as described earlier. In order to make the track-number order from the track number #1 to the track number #10 set on the MD match the track order from the track Tr1 to the track Tr10 set on the CD as shown in 17C, it is necessary to modify the information stored in the U-TOC to U-TOC information reflecting a track-number order matching the track order by referring to the dubbing-order table shown in FIG. 18.

The track Tr2 dubbed from the CD-A is used to exemplify an example of a modification made to the information stored in the U-TOC.

Since the track Tr2 is dubbed as a 9th track, an area on the MD for recording the track Tr2 is described in the part entry 09h in the U-TOC shown in FIG. 19, which is pointed to by the part-entry pointer P-TNO9 for the track number #9 on the MD set at 09h and includes the start address A16 and the end address A17. In order to treat the track Tr2 as a track with the track number #2 on the MD, the part-entry pointer P-TNO2 corresponding to the track number #2 on the MD is set at 09h to point to the part entry 09h describing the track Tr2.

Other changes are made to the U-TOC information in the same way as the above example described for the track Tr2 to make the track-number order from the track number #1 to the track number #10 set on the MD match the track order from the track Tr1 to the track Tr10 set on the CD as shown in 17C. FIG. 20 is a diagram showing data of a part-entry-pointer table and a management table (or part-entry table) in U-TOC sector 0, which is obtained as a result of the changes made to make the track-number order match the track order.

The data of the management table shown in the lower part of FIG. 20 is the same as that shown in FIG. 19. On the other hand, the data of the part-entry-pointer table shown in the upper part of FIG. 20 is different from that shown in FIG. 19.

To put it in detail, the part-entry-pointer table shown in the upper part of FIG. 20 now contains the following data. The part-entry pointer P-TNO1 corresponding to the track number #1 on the MD is set at 01h pointing to a part entry 01h including a start address A0 and an end address A1 of an area for recording the track Tr1.

In the same way, the part-entry pointer P-TNO2 corresponding to the track number #2 on the MD is set at 09h pointing to a part entry 09h including a start address A16 and an end address A17 of an area for recording the track Tr2.

By the same token, the part-entry pointer P-TNO3 corresponding to the track number #3 on the MD is set at 02h pointing to a part entry 02h including a start address A2 and an end address A3 of an area for recording the track Tr3. Similarly, the part-entry pointer P-TNO4 corresponding to the track number #4 on the MD is set at 0Ah pointing to a part entry 0Ah including a start address A18 and an end address A19 of an area for recording the track Tr4. Likewise, the part-entry pointer P-TNOj corresponding to the track number #j on the MD is set at 0kh pointing to a part entry 0kh including a start address Al and an end address Am of an area for recording the track Trj where j=5 to 10, k=j-2, l=2j-6 and m=2j-5.

To put it concretely, for j=5, the part-entry pointer P-TNO5 corresponding to the track number #5 on the MD is set at 03h pointing to a part entry 03h including a start address A4 and an end address A5 of an area for recording the track Tr5. In the same way, for j=6, the part-entry pointer P-TNO6 corresponding to the track number #6 on the MD is set at 04h pointing to a part entry 04h including a start address A6 and an end address A7 of an area for recording the track Tr6. By the same token, for j=7, the part-entry pointer P-TNO7 corresponding to the track number #7 on the MD is set at 05h pointing to a part entry 05h including a start address A8 and an end address A9 of an area for recording the track Tr7. Similarly, for j=8, the part-entry pointer P-TNO8 corresponding to the track number #8 on the MD is set at 06h pointing to a part entry 06h including a start address A10 and an end address A11 of an area for recording the track Tr8. Likewise, for j=9, the part-entry pointer P-TNO9 corresponding to the track number #9 on the MD is set at 07h pointing to a part entry 07h including a start address A12 and an end address A13 of an area for recording the track Tr9. Finally, for j=10, the part-entry pointer P-TNO10 corresponding to the track number #10 on the MD is set at 08h pointing to a part entry 08h including a start address A14 and an end address A15 of an area for recording the track Tr10.

It should be noted that, in this case, the part-entry pointer P-FRA pointing to a part entry describing a free area and the part-entry pointer P-EMPTY pointing to a first unused part entries in the management table are the same as those shown in FIG. 19.

The dubbing operations exemplified by the second implementation of the embodiment are all completed when the processing to update the U-TOC, that is, the process to rearrange the tracks into a new order, is finished.

In accordance with the dubbing operations exemplified by the second implementation, the operations begin with sequential recording of results of high-speed dubbing carried out on tracks found exempted from the HCMS management at the beginning of the operations. After the high-speed dubbing is completed, the state of the HCMS management is usually examined to identify tracks, which have become exempted from the HCMS management in the course of the high-speed dubbing. If such a track is identified, the track is subjected to high-speed dubbing and recorded on to the target disc, taking precedence of other undubbed tracks.

This process is repeated till all tracks, which have become exempted from the HCMS management in the course of the high-speed dubbing, are dubbed at a high speed. Remaining tracks, which have not become exempted from the HCMS management in the course of the high-speed dubbing, are dubbed sequentially at a 1-time speed. For this reason, the dubbing speed is switched from the high speed to the 1-time speed.

Comparison of the first implementation with the second one indicates that, in both the examples, a track, which is an object of management in the course of the high-speed dubbing in the high-speed-dubbing mode, is dubbed sequentially at a 1-time speed.

In the case of the second implementation, however, tracks, which are exempted from the HCMS management or have become exempted from the HCMS management in the course of the high-speed dubbing, are dubbed first at a high speed in batch processing, while remaining tracks, which have not become exempted from the HCMS management in the course of the high-speed dubbing, are dubbed at a 1-time speed after checking the HCMS-management status. Thus, the number of operations to switch the dubbing speed in the second example is smaller than that in the first implementation, resulting in an advantage of a higher dubbing efficiency. In addition, the number of control operations for varying the rotational speed of the spindle motor or the like to implement a speed change also decreases, giving rise to a possible merit of reduced power consumption.

In the case of the second implementation, on the other hand, there is possibly an unavoidable case in which tracks are recorded onto the MD in a recording order not matching the order of increasing track numbers assigned to the tracks in the CD. In order to provide the user with convenience of dubbing and recording, it also becomes necessary to consider a device of making the track order in a destination of dubbing match the track order in a source of dubbing by updating information stored in the U-TOC as described above. In this respect, since tracks are dubbed from a recording medium serving as a source of dubbing in the track order in the case of the first implementation, the above consideration is not necessary.

Figure 21:
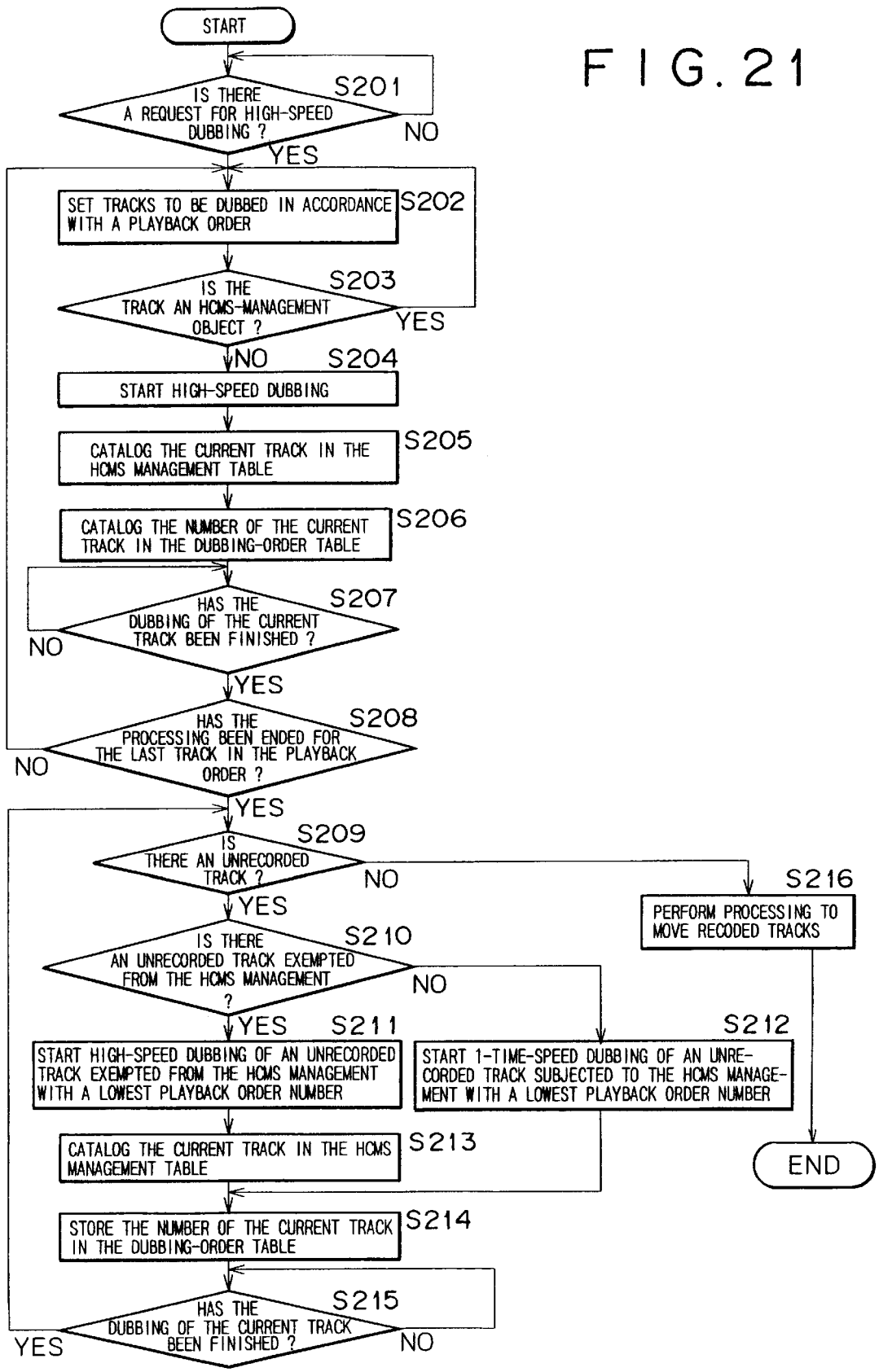
FIG. 21 shows a flowchart representing operations carried out by a second embodiment of the present invention.

The following description explains processing to implement the dubbing operations exemplified by the second implementation by referring to a flowchart shown in FIG. 21. Much like the processing represented by the flowchart shown in FIG. 14, the system controller 21 carries out the operations represented by the flowchart.

As shown in the figure, the processing begins with a step S201 at which the system controller 21 enters a state of waiting for a request for high-speed dubbing to be made. As the user makes a request for high-speed dubbing by typically carrying out an operation to start high-speed dubbing, the flow of the processing goes on to a step S202.

At the step S202, a current track is determined as a track to be dubbed from a playback order such as a track-number order set in the CD unit for a recording medium, which serves as a source of dubbing. In the following description, a current track is a track serving as a current object of dubbing.

At the next step S203, the HCMS-management-table memory 22 is referenced for information on a current track to be dubbed to form a judgment as to whether high-speed dubbing of the current track is prohibited or permitted, that is, whether or not the information on the current track is found in the HCMS-management-table memory 22 as an object of the HCMS management.

A result of referencing the HCMS-management-table memory 22 indicating that the information on the current track is cataloged in the HCMS-management-table memory 22 can be interpreted as prohibited high-speed dubbing of the current track. In this case, the flow of the processing goes back to the step S202 at which a next current track is determined. To put in detail, a new track to be dubbed after the current track is determined from the playback order. In the example shown in FIG. 16, if the current track is the track Tr2, which is an object of the HCMS management, the flow processing goes back to the step S202 at which the track Tr3 is determined as a next track to be dubbed. By the same token, if the current track is the track Tr4, which is another object of the HCMS management, the flow processing goes back to the step S202 at which the track Tr5 is determined as a next track to be dubbed.

On the other hand, a result of referencing the HCMS-management-table memory 22 at the step S203 indicating that the information on the current track is not cataloged in the HCMS-management-table memory 22 as an object of the HCMS management can be interpreted as allowed high-speed dubbing of the current track. In this case, the flow of the processing goes back on to a step S204 at which processing to start the high-speed dubbing of the current track is carried out. At the next step S205, the current track, the high-speed dubbing of which is started, is cataloged in the HCMS-management-table memory 22 with a timing of the beginning of the high-speed dubbing. At the next step S206, processing is carried out to catalog the track number of the current track, the high-speed dubbing of which was started, in the dubbing-order table shown in FIG. 18.

The flow of the processing then goes on to a step S207 to enter a state of waiting for the high-speed dubbing of the current track to be completed. As the completion of the high-speed dubbing of the current track is detected, the flow of the processing proceeds to a step S208.

At the step S208, the system controller 21 forms a judgment as to whether or not the last track in the playback order has been subjected to the pieces of processing carried out at the steps S202 to S207. In these pieces of processing, each track recorded on the CD is checked in the playback order to determine whether or not the track is an object of the HCMS management. Dubbing of a track determined to be an object of the HCMS management is deferred. Only tracks exempted from the HCMS management are subjected to high-speed dubbing.

If the outcome of the judgment formed at the step S208 indicates a negation, that is, the last track in the playback order has not been subjected to the pieces of processing carried out at the steps S202 to S207, these pieces of processing are carried out on a next track to be dubbed. If the outcome of the judgment formed at the step S208 indicates an acknowledgement, that is, the last track in the playback order has been subjected to the pieces of processing carried out at the steps S202 to S207, on the other hand, the flow of the processing goes on to a step S209. In the case of the example shown in FIG. 16, for instance, the flow goes on from the step S208 to S209 when all the tracks Tr1 to Tr10 recorded on the CD-A except Tr2 and Tr4 have completed high-speed dubbing, being recorded onto the MD.

At the step S209, the system controller 21 forms a judgment as to whether or not there exists a track, which is supposed to be dubbed but has not been subjected to dubbing yet. A track supposed to be dubbed but not subjected to dubbing yet is a track the information on which is cataloged in the HCMS-management-table memory 22 to indicate prohibition of high-speed dubbing thereof in accordance with a result of the judgment formed at the step S203.

If a track supposed to be dubbed but not subjected to dubbing yet exists, the flow of the processing goes on to a step S210.

At the step S210, the current data stored in the HCMS-management-table memory 22 is examined to form a judgment as to whether or not a track not subjected to high-speed dubbing yet has become exempted from the HCMS management. If a track not subjected to high-speed dubbing yet has become exempted from the HCMS management, the flow of the processing goes on to a step S211. If such a track does not exist, on the other hand, the flow of the processing goes on to a step S212. At the step S211, a track that was not subjected to high-speed dubbing yet but has become exempted from the HCMS management is dubbed at a high speed, taking precedence of others.

To put it in detail, at the step S211, the first track in the playback order among tracks that have become exempted from the HCMS management is selected as a track to be dubbed. It should be noted that, if there is only one track that was not subjected to high-speed dubbing yet but has become exempted from the HCMS management, the track is naturally selected as a track to be dubbed. Control is then executed to start high-speed dubbing for the track selected as a track to be dubbed.

Subsequently, at the next step S213, the current track, the high-speed dubbing of which was started at the step S211, is cataloged in the HCMS-management-table memory 22 with a timing of the beginning of the high-speed dubbing in the same way as the step S205.

Then, at the next step S214, processing is carried out to catalog the track number of the current track, the high-speed dubbing or the 1-time-speed dubbing of which was started respectively at the step S211 or S212 to be described later, in the dubbing-order table shown in FIG. 18.

The flow of the processing then goes on to a step S215 to enter a state of waiting for the dubbing of the current track to be completed. As the completion of the dubbing of the current track is detected, the flow of the processing goes back to the step S209.

If the outcome of the judgment formed at the step S210 indicates that no track not subjected to high-speed dubbing yet has become exempted from the HCMS management, on the other hand, the flow of the processing goes on to the step S212 as described above. At the step S212, the first track in the playback order among tracks that were not subjected to high-speed dubbing and have not become exempted from the HCMS management yet is selected as an object of dubbing. 1-time-speed dubbing of the track selected as a track to be dubbed is then started. Finally, the flow of the processing goes back to the step S209 by way of the steps S214 and S215.

If the outcome of the judgment formed at the step S209 indicates that there is no longer track, which is supposed to be dubbed but has not been subjected to dubbing yet, on the other hand, the flow of the processing proceeds to a step S216.

At the step S216, the U-TOC is updated so as to make the track order of dubbed tracks under management by the MD unit match the track order of tracks recorded on the CD under management by the CD unit as described earlier by referring to FIGS. 17 to 20. The processing represented by the flowchart shown in FIG. 21 is ended as the process to update the U-TOC is completed.

It should be noted that the scope of the present invention is not limited to the configurations of the embodiments described above.

For example, the embodiments described above each implement a dubbing apparatus integrating an MD recorder/player for driving a recording medium serving as a destination of dubbing and a CD player for driving a recording medium serving as a source of dubbing. It is worth noting that the present invention can also be applied to a system in which a recording apparatus for driving a recording medium serving as a destination of dubbing is provided separately from a recording apparatus for driving a recording medium serving as a source of dubbing.

In addition, the present invention can also be applied to a dubbing system including a plurality of MD recorders and players and a dubbing system employing a recording or playback apparatus for driving tape media such as DAT and a tape cassette recorder.

In the future, besides the applications to dubbing systems for copying audio data played back from recording media serving as a source of dubbing, it is conceivable to apply the present invention also to a system for dubbing audio data received from a source of dubbing by a means such as a radio tuner or a tuner of digital satellite broadcasting as long as the source of dubbing can be controlled by typically a copy management system.

The dubbing apparatus provided by the present invention has a management function conforming to a regulation whereby next high-speed dubbing of a program or a track subjected once to previous high-speed dubbing is prohibited during a predetermined period of time beginning from the start point of the previous high-speed dubbing. In the configuration of the subbing apparatus, a program, high-speed dubbing of which is prohibited, is not dubbed at a high speed. Instead, the dubbing speed is switched from a high speed to a low one on the basis of typically the present state of management. In an actual typical application, for example, a program, high-speed dubbing of which is permitted, is dubbed at a high speed. On the other hand, a program, high-speed dubbing of which is prohibited, is dubbed and recorded at a low speed.

Thus, in accordance with the present invention, when a program, high-speed dubbing of which is prohibited at the present time, is to be dubbed in the course of high-speed dubbing in a high-speed-dubbing mode, the program can be dubbed at a low speed at a predetermined opportunity. Therefore, at a stage such a program is determined to be an object to undergo dubbing, the dubbing operation for the program is not halted. As a result, the present invention is capable of sustaining the convenience of the dubbing function while protecting copyrights.

In the configuration of the present invention, dubbing and recording of programs onto a recording medium serving as a destination of dubbing are carried out in an order the programs were recorded on the recording medium serving as a source of dubbing. When a program, high-speed dubbing of which is prohibited, is encountered in the course of the dubbing and recording, the program is dubbed at a low speed. As for a program, high-speed dubbing of which is permitted, high-speed dubbing is carried out.

In such a configuration, programs are dubbed from a recording medium serving as a source of dubbing in an order the programs were recorded onto the recording medium. Thus, the programs are recorded onto a recording medium serving as a destination in the same order as the programs were recorded onto the recording medium serving as a destination.

In an alternative configuration of the present invention described above, if a program selected as an object of dubbing happens to be a program under control to prohibit high-speed dubbing thereof, this program is temporarily excluded from a list of dubbing objects and another program is selected as a next object of dubbing instead. That is to say, the high-speed dubbing of the program, which has its high-speed dubbing prohibited at the present time and is thus temporarily excluded from the list of dubbing objects, is deferred to a later predetermined opportunity.

In such a configuration, programs, which are supposed to be dubbed and have high-speed dubbing thereof permitted, are first dubbed at a high speed and recorded onto a destination recording medium, taking precedence of other programs. Accordingly, the time efficiency of the dubbing operation is improved. In addition, the number of operations to switch the system for driving the recording media and the system for processing signals can be decreased, resulting in improvements such as enhancement of the processing efficiency and reduction of the power consumption.

The dubbing and recording described above are carried out by referring to the management state. Programs, which are on a list of dubbing objects and have high-speed dubbing thereof permitted, are first dubbed at a high speed. On the other hand, programs, which are on a list of dubbing objects but have high-speed dubbing thereof prohibited, are put on a list of deferred-dubbing objects. After the last program on the list of dubbing objects is processed, the list of deferred-dubbing objects is searched for programs, the status of the high-speed dubbing of which was changed from prohibited to permitted in the course of the dubbing and recording. Programs, which are on a list of deferred-dubbing objects and have high-speed dubbing thereof permitted, are first dubbed at a high speed. On the other hand, programs, which are on a list of deferred-dubbing objects but have high-speed dubbing thereof still prohibited, are typically dubbed at a low speed.

With the additional procedure adopted in the alternative configuration described above, the status of programs, which have high-speed dubbing thereof prohibited and are thus put on a list of deferred-dubbing objects, may be changed from prohibited to permitted in the course of the dubbing and recording. Such programs can thus be subjected to high-speed dubbing. As a result, the time efficiency of the dubbing operation can be improved.

As described above, the high-speed dubbing begins with programs, which are on a list of dubbing objects and have high-speed dubbing thereof permitted and programs, which are on a list of deferred-dubbing objects and have the status of high-speed dubbing thereof changed from "prohibited" to "permitted". The dubbing operation continues to low-speed dubbing of programs, which are on a list of deferred-dubbing objects but have high-speed dubbing thereof still prohibited. In this case, however, programs are recorded onto a recording medium serving as a destination of dubbing in an order different from the recording order of the programs on a recording medium serving as a dubbing source. In order to solve this problem, the present invention automatically carries out processing to change the program order on the recording medium serving as a destination of dubbing so as to make the program order on the recording medium serving as a destination of dubbing match the program order on the recording medium serving as a source of dubbing.

It is thus possible to obtain a recording medium serving as a destination of dubbing with a program order matching the program order on the recording medium serving as a source of dubbing, hence, making the dubbing function better even if programs, which are supposed to be dubbed and have high-speed dubbing thereof permitted, are first dubbed at a high speed and recorded onto a destination recording medium, taking precedence of other programs. In addition, since it is no longer necessary for the user to carry out later editing work to change the program order, the magnitude of a load borne by the user decreases.

While a preferred embodiment of the present invention has been described using specific terms, such description is for illustrative purposes only, and it is to be understood that changes and variations may be made without departing from the spirit or scope of the following claims.

What is claimed is:

1. A dubbing apparatus capable of selecting either a predetermined-speed dubbing mode or a high-speed dubbing mode allowing dubbing of data to be carried out within a period of time shorter than that of said predetermined-speed dubbing mode in an operation to record data played back from a first recording medium for recording data controlled in program units into a second recording medium, said dubbing apparatus comprising:

time-measuring means for measuring the lapse of time;

time-measurement control means for requesting said time-measuring means to start a time measurement for a particular piece of data selected from pieces of data recorded on said first recording medium and controlled in program units to undergo high-speed dubbing;

time-information storage means for storing time information produced by said time-measuring means for a particular piece of data selected from said pieces of data recorded on said first recording medium and controlled in program units to undergo high-speed dubbing;

operation means for selecting a particular piece of data desired by the user as an object of high-speed dubbing from said pieces of data recorded on said first recording medium and controlled in program units; and control means for referencing time information stored in said time-information storage means for a particular piece of data selected by said operation means as desired by said user as an object of high-speed dubbing and for switching from said predetermined-speed dubbing mode to said high-speed dubbing mode or vice versa in accordance with said referenced time information.

2. A dubbing apparatus according to claim 1, said apparatus further comprising comparison means for comparing time information stored in said time-information storage means for a particular piece of data selected by said operation means as desired by the user as an object of high-speed dubbing with a predetermined period of time, wherein said high-speed dubbing mode is switched to said predetermined-speed dubbing mode or vice versa for said particular piece of data by said control means in dependence on a result of comparison produced by said comparison means.

3. A dubbing apparatus according to claim 2 wherein said control means prohibits high-speed dubbing of a particular piece of data selected by said operation means as desired by the user as an object of high-speed dubbing but allows predetermined-speed dubbing of said particular piece of data to be carried out in case a result of comparison produced by said comparison means indicates that time information stored in said time-information storage means for said particular piece of data is smaller than said predetermined period of time.

4. A dubbing apparatus according to claim 2 wherein said control means allows high-speed dubbing of a particular piece of data selected by said operation means as desired by the user as an object of high-speed dubbing in case a result of comparison produced by said comparison means indicates that time information stored in said time-information storage means for said particular piece of data is equal to or greater than said predetermined period of time.

5. A dubbing apparatus capable of selecting either a predetermined-speed dubbing mode or a high-speed dubbing mode allowing dubbing of data to be carried out within a period of time shorter than that of said predetermined-speed dubbing mode in an operation to record data played back from said first recording medium for recording data controlled in program units into a second recording medium, said dubbing apparatus comprising:

information storage means for storing information associated with one of said pieces of data stored in said first recording medium and used for indicating whether or not said piece of data associated with said information has been subjected to high-speed dubbing during a predetermined period of time in the past with the present point of time taken as a reference;

first high-speed-dubbing-judging means for forming a judgment as to whether or not a piece of data stored on said first recording medium and specified to undergo high-speed dubbing has been subjected to high-speed dubbing during a predetermined period of time in the past with the present point of time taken as a reference on the basis of information stored in said information storage unit and associated with said piece of data; and recording control means for assigning pending status to high-speed dubbing of a piece of data stored on said first recording medium and judged by said first high-speed-dubbing-judging means to be a piece of data subjected to high-speed dubbing during a predetermined period of time in the past with the present point of time taken as a reference and for implementing high-speed dubbing of a piece of data stored on said first recording medium and judged by said high-speed-dubbing-judging means to be a piece of data not subjected to high-speed dubbing during a predetermined period of time in the past with the present point of time taken as a reference on a priority basis.

6. A dubbing apparatus according to claim 5, said apparatus further comprising second high-speed-dubbing-judging means for forming a judgment as to whether or not all pieces of data stored on said first recording medium, specified to undergo high-speed dubbing and judged by said first high-speed-dubbing-judging means to have not been subjected to high-speed dubbing during a predetermined period of time in the past with the present point of time taken as a reference have been dubbed at a high speed into said second recording medium, wherein said recording control means starts sequential high-speed dubbing for pieces of data stored on said first recording medium, specified to undergo high-speed dubbing and judged by said first high-speed-dubbing-judging means to have been subjected to high-speed dubbing during a predetermined period of time in the past with the present point of time taken as a reference in case an outcome of a judgment formed by said second high-speed-dubbing-judging means indicates that all pieces of data stored on said first recording medium, specified to undergo high-speed dubbing and judged by said first high-speed-dubbing-judging means to have not been subjected to high-speed dubbing during a predetermined period of time in the past with the present point of time taken as a reference have been dubbed at a high speed into said second recording medium.

7. A dubbing apparatus according to claim 5, said apparatus further comprising second high-speed-dubbing-judging means for forming a judgment as to whether or not all pieces of data stored on said first recording medium, specified to undergo high-speed dubbing and judged by said first high-speed-dubbing-judging means to have not been subjected to high-speed dubbing during a predetermined period of time in the past with the present point of time taken as a reference have been dubbed at a high speed into said second recording medium, wherein said recording control means starts sequential high-speed dubbing for pieces of data with high-speed dubbing thereof put in said pending status in case an outcome of a judgment formed by said second high-speed-dubbing-judging means indicates that all pieces of data stored on said first recording medium, specified to undergo high-speed dubbing and judged by said first high-speed-dubbing-judging means to have not been subjected to high-speed dubbing during a predetermined period of time in the past with the present point of time taken as a reference have been dubbed at a high speed into said second recording medium.

8. A dubbing apparatus according to claim 5, said apparatus further comprising:
  time-measuring means for measuring the lapse of time;
  time-measurement control means for requesting said time-measuring means to start a time measurement for a particular piece of data selected from pieces of data recorded on said first recording medium and controlled in program units to undergo high-speed dubbing; and
  comparison means for comparing time information obtained as a result of said time measurement started by said time-measurement control means with said predetermined period of time.

9. A dubbing apparatus according to claim 5 wherein:
  said second recording medium has a management area for storing management information for controlling program areas for storing pieces of data played back from said first recording medium and a playback order of said pieces of data stored in said program areas; and
  said management information stored in said management area of said second recording medium is edited to make said playback order of said pieces of data stored in said program areas of said second recording medium match a playback order of said pieces of data on said first recording medium.

10. A dubbing-processing method for prohibiting high-speed dubbing of a program stored on a first recording medium and subjected to high-speed dubbing during a predetermined period of time in the past with the present point of time taken as a reference till the end of the lapse of said predetermined period of time as a reaction to a command to again carry out high-speed dubbing on said program, said dubbing-processing method comprising the steps of:
  forming a judgment as to whether or not a program stored in said first recording medium and specified to undergo high-speed dubbing is an object of high-speed-dubbing prohibition; and
  permitting predetermined-speed dubbing of a program stored in said first recording medium, specified to undergo high-speed dubbing and judged to be an object of high-speed-dubbing prohibition.

11. A dubbing-processing method according to claim 10, said method further comprising the steps of:
  measuring the lapse of time;
  forming a judgment as to whether or not said lapse of time measured for a program stored in said first recording medium, specified to undergo high-speed dubbing and judged to be an object of high-speed-dubbing prohibition is at least equal to said predetermined period of time; and
  allowing high-speed dubbing of a program stored in said first recording medium, specified to undergo high-speed dubbing and judged to be an object of high-speed-dubbing prohibition to be carried out if an outcome of said judgment indicates that said lapse of time measured for said program is at least equal to said predetermined period of time.

12. A dubbing-processing method according to claim 11, said method further comprising the step of allowing predetermined-speed dubbing of a program stored in said first recording medium, specified to undergo high-speed dubbing and judged to be an object of high-speed-dubbing prohibition to be carried out if an outcome of said judgment indicates that said lapse of time measured for said program is shorter than said predetermined period of time.

13. A dubbing-processing method for carrying out sequential high-speed dubbing on a program stored on a first recording medium to a second recording medium in a dubbing apparatus prohibiting high-speed dubbing of a program stored on a first recording medium and subjected to high-speed dubbing during a predetermined period of time in the past with the present point of time taken as a reference till the end of the lapse of said predetermined period of time as a reaction to a command to again carry out high-speed dubbing on said program, said dubbing-processing method comprising the steps of:
  sequentially forming a judgment as to whether or not a program stored in said first recording medium and specified to undergo high-speed dubbing is an object of high-speed-dubbing prohibition;
  assigning pending status to high-speed dubbing of a program stored on said first recording medium, specified to undergo high-speed dubbing and judged to be an object of high-speed-dubbing prohibition and implementing high-speed dubbing of a program stored on said first recording medium, specified to undergo high-speed dubbing and judged to be not an object of high-speed-dubbing prohibition in the past on a priority basis;
  forming a judgment as to whether or not all programs each stored on said first recording medium and judged to be not an object of high-speed-dubbing prohibition have each completed high-speed dubbing to said second recording medium; and
  recording programs each stored on said first recording medium and judged to be an object of high-speed-dubbing prohibition onto said second recording medium starting with one of said programs having the lapse of said predetermined period of time completed upon completion of said high-speed dubbing of all programs each stored on said first recording medium and judged to be not an object of high-speed-dubbing prohibition to said second recording medium.

14. A dubbing-processing method according to claim 13, said method further comprising the steps of:
  measuring the lapse of time;
  forming a judgment as to whether or not said lapse of time measured for a program stored in said first recording medium, specified to undergo high-speed dubbing and judged to be an object of high-speed-dubbing prohibition is at least equal to said predetermined period of time; and allowing high-speed dubbing of a program stored in said first recording medium, specified to undergo high-speed dubbing and judged to be an object of high-speed-dubbing prohibition to be carried out if an outcome of said judgment indicates that said lapse of time measured for said program is at least equal to said predetermined period of time after all programs each stored in said first recording medium, specified to undergo high-speed dubbing and judged to be not an object of high-speed-dubbing prohibition have been dubbed at a high speed onto said second recording medium.

15. A dubbing-processing method according to claim 13, further comprising the steps of:

providing a management area for storing management information for controlling program areas for storing pieces of data played back from said first recording medium and a playback order of said pieces of data stored in said program areas on said second recording medium; and editing said management information stored in said management area of said second recording medium so as to make said playback order of said pieces of data stored in said program areas of said recording medium match a playback order of said pieces of data on said first recording medium.

* * * * *

UNITED STATES PATENT AND TRADEMARK OFFICE
CERTIFICATE OF CORRECTION

PATENT NO.    : 6,388,965 B2                                              Page 1 of 1
DATED         : May 14, 2002
INVENTOR(S)   : Hiroyuki Ozawa et al.

It is certified that error appears in the above-identified patent and that said Letters Patent is hereby corrected as shown below:

Column 1,
Line 8, replace "typically" with -- typical --

Column 2,
Line 43, replace "till" with -- until --

Column 5,
Line 18, insert -- are -- after the word "elements"

Column 9,
Lines 60, 62 and 64, replace "CLK.M" with -- CLK˙M --

Column 16,
Line 18, replace "pattern.n" with -- pattern. --

Column 31,
Line 19, replace "in typically" with -- as --

Signed and Sealed this

Twenty-eighth Day of January, 2003

JAMES E. ROGAN
*Director of the United States Patent and Trademark Office*